US011922907B2

(12) United States Patent
Piscoi et al.

(10) Patent No.: US 11,922,907 B2
(45) Date of Patent: Mar. 5, 2024

(54) ELECTRONIC CYMBAL INSTRUMENTS AND SYSTEMS

(71) Applicant: Drum Workshop, Inc., Oxnard, CA (US)

(72) Inventors: Paul Piscoi, Dumbravita (RO); Mark Moralez, Oxnard, CA (US); Rich Sikra, Thousand Oaks, CA (US); Connor Lombardi, Oxnard, CA (US); Marcus Ryle, Oxnard, CA (US)

(73) Assignee: Drum Workshop, Inc., Oxnard, CA (US)

( * ) Notice: Subject to any disclaimer, the term of this patent is extended or adjusted under 35 U.S.C. 154(b) by 303 days.

(21) Appl. No.: 17/153,824

(22) Filed: Jan. 20, 2021

(65) Prior Publication Data

US 2021/0225346 A1 Jul. 22, 2021

Related U.S. Application Data

(60) Provisional application No. 63/011,882, filed on Apr. 17, 2020, provisional application No. 62/963,504, filed on Jan. 20, 2020.

(51) Int. Cl.
*G10D 13/10* (2020.01)
*G10D 13/02* (2020.01)
(Continued)

(52) U.S. Cl.
CPC ............ *G10D 13/26* (2020.02); *G10D 13/02* (2013.01); *G10H 1/0008* (2013.01); *G10H 1/32* (2013.01);
(Continued)

(58) Field of Classification Search
CPC ...... G10D 13/26; G10D 13/02; G10H 1/0008; G10H 1/32; G10H 1/348; G10H 3/10; G10H 2220/461
(Continued)

(56) References Cited

U.S. PATENT DOCUMENTS 4,242,937 A * 1/1981 Pozar ..................... G10D 13/02 84/DIG. 12
5,262,585 A * 11/1993 Greene ................ G10H 1/0066 84/738
(Continued)

FOREIGN PATENT DOCUMENTS

AU 2018210857 A1 * 7/2019 ............. G10D 13/02
AU 2018210857 3/2022
(Continued)

OTHER PUBLICATIONS

Nishikawa et al., Bateryless wireless transmission system for electronic drum uses piezoelectric generator for play signal and power source, 2015, Journal of Physics: Conference Series (Year: 2015).*
(Continued)

*Primary Examiner* — Christina M Schreiber
(74) *Attorney, Agent, or Firm* — Ferguson Case Orr Paterson

(57) ABSTRACT

This disclosure relates generally to electronic musical instruments, systems, and methods. More particularly, this disclosure relates to electronic percussion instruments such as tom toms, snare drums, bass drums, cymbals, and hi-hats, and assemblies of instruments (e.g., percussion instruments), such as drum sets. Even more particularly, this disclosure relates to wireless electronic percussion instruments, and percussion instruments with interchangeable and/or removable components to change the instrument between a traditional percussion instrument (that relies on resonance and/or vibration to produce sound) and an electronic percussion instrument. The present disclosure also relates to electronic cymbal instruments, such as cymbal assemblies and hi-hat assemblies, that can be used in conjunction with a traditional acoustic metal cymbal.

19 Claims, 22 Drawing Sheets

(51) Int. Cl.

| | |
|---|---|
| ***G10H 1/00*** | (2006.01) |
| ***G10H 1/32*** | (2006.01) |
| ***G10H 1/34*** | (2006.01) |
| ***G10H 3/10*** | (2006.01) |

(52) U.S. Cl.
CPC ............... *G10H 1/348* (2013.01); *G10H 3/10* (2013.01); *G10H 2220/461* (2013.01)

(58) Field of Classification Search
USPC ........................................................... 84/733
See application file for complete search history.

(56) References Cited

U.S. PATENT DOCUMENTS

| | | | | |
|---|---|---|---|---|
| 6,271,458 | B1 * | 8/2001 | Yoshino | G10H 3/146 84/738 |
| 6,632,989 | B2 * | 10/2003 | Yoshino | G10H 3/146 84/723 |
| 6,756,535 | B1 * | 6/2004 | Yoshino | G10D 13/02 84/738 |
| 6,822,148 | B2 | 11/2004 | Yanase | |
| 6,881,885 | B2 | 4/2005 | Yoshino et al. | |
| 6,921,857 | B2 | 7/2005 | Yoshino et al. | |
| 7,038,117 | B2 | 5/2006 | Yoshino | |
| 7,385,135 | B2 | 6/2008 | Yoshino et al. | |
| 7,396,991 | B2 | 7/2008 | Susami | |
| 7,459,626 | B2 * | 12/2008 | Yoshino | G10H 1/34 84/723 |
| 7,468,483 | B2 | 12/2008 | Yoshino | |
| 7,473,840 | B2 * | 1/2009 | Arimoto | G10H 1/06 84/615 |
| 7,491,877 | B1 * | 2/2009 | Cherny | G10D 13/02 84/411 R |
| 7,612,273 | B2 | 11/2009 | Matsuyuki | |
| 7,694,780 | B2 * | 4/2010 | Beels van Heemstede | F16H 57/0434 184/26 |
| 7,943,841 | B2 * | 5/2011 | Toda | G10H 3/146 84/411 R |
| 8,253,001 | B1 * | 8/2012 | Liu | G10D 13/26 84/411 R |
| 8,563,843 | B1 * | 10/2013 | Shemesh | G10H 7/00 84/723 |
| 8,754,318 | B2 * | 6/2014 | Mori | G10H 1/32 84/723 |
| 8,946,536 | B2 * | 2/2015 | Field | G10H 3/146 84/723 |
| 9,330,643 | B2 | 5/2016 | Field | |
| 9,390,697 | B2 * | 7/2016 | Takegawa | G10H 1/32 |
| 9,424,827 | B2 | 8/2016 | Gill | |
| 9,721,549 | B2 | 8/2017 | Sikra | |
| 9,773,480 | B2 * | 9/2017 | Rapp | G10H 7/00 |
| 9,812,110 | B2 * | 11/2017 | Borman | G10H 1/057 |
| 10,032,440 | B2 | 7/2018 | Field | |
| 10,147,409 | B2 * | 12/2018 | Takasaki | G10H 1/0551 |
| 10,475,424 | B2 | 11/2019 | Motohashi | |
| 10,657,944 | B2 * | 5/2020 | Steinhauser | G10H 3/146 |
| 10,672,370 | B2 * | 6/2020 | Takegawa | G10D 13/28 |
| 10,679,591 | B2 | 6/2020 | Gewa | |
| 10,924,847 | B2 * | 2/2021 | Ryle | H04R 3/00 |
| 11,335,310 | B2 * | 5/2022 | Suitor | G10D 13/063 |
| 11,404,037 | B2 * | 8/2022 | Takasaki | G10H 3/146 |
| 2002/0112593 | A1 * | 8/2002 | Yanase | G10D 13/02 84/411 P |
| 2004/0118269 | A1 * | 6/2004 | Yoshino | G10H 3/146 84/723 |
| 2005/0014510 | A1 * | 1/2005 | Jeon | H04L 45/00 455/445 |
| 2005/0039593 | A1 * | 2/2005 | Wachter | G10H 3/146 84/730 |
| 2005/0150366 | A1 * | 7/2005 | Susami | G10H 3/146 84/735 |
| 2006/0083235 | A1 | 4/2006 | Mizuno | |
| 2006/0156910 | A1 * | 7/2006 | Yoshino | G10H 1/34 84/723 |
| 2007/0137460 | A1 * | 6/2007 | Mori | G10D 13/02 84/421 |
| 2007/0234886 | A1 * | 10/2007 | Matsuyuki | G10H 3/146 84/723 |
| 2008/0034946 | A1 * | 2/2008 | Aimi | G10H 7/002 84/604 |
| 2013/0047826 | A1 * | 2/2013 | Wissmuller | G10H 3/146 84/723 |
| 2013/0180388 | A1 * | 7/2013 | Mori | G10H 3/14 84/723 |
| 2013/0252548 | A1 | 9/2013 | Levy | |
| 2013/0340598 | A1 * | 12/2013 | Marquez | G10H 3/146 84/730 |
| 2014/0150630 | A1 * | 6/2014 | Juszkiewicz | G10H 1/02 84/626 |
| 2014/0208926 | A1 * | 7/2014 | Shepherd | G10D 13/10 84/730 |
| 2014/0251116 | A1 * | 9/2014 | Peterson | G10H 1/0558 84/723 |
| 2014/0260916 | A1 * | 9/2014 | Oppel | G10H 1/0016 84/626 |
| 2015/0027301 | A1 * | 1/2015 | Shih | G10H 3/12 84/730 |
| 2015/0294658 | A1 * | 10/2015 | Gill | G10H 3/12 84/723 |
| 2016/0196811 | A1 * | 7/2016 | Shen | G10H 3/146 84/422.1 |
| 2016/0203804 | A1 * | 7/2016 | Carpenter, Sr. | G10D 13/10 84/422.3 |
| 2016/0210943 | A1 * | 7/2016 | Sikra | G10D 13/28 |
| 2016/0247492 | A1 * | 8/2016 | Field | G10D 13/02 |
| 2016/0284184 | A1 | 9/2016 | Bean | |
| 2016/0309420 | A1 * | 10/2016 | Verma | H04W 52/243 |
| 2017/0116971 | A1 * | 4/2017 | Lehrman | G10D 13/02 |
| 2018/0061386 | A1 * | 3/2018 | Takasaki | G10H 3/143 |
| 2018/0174556 | A1 * | 6/2018 | Steinhauser | G10D 13/26 |
| 2018/0204557 | A1 * | 7/2018 | Steinhauser | G10D 13/02 |
| 2019/0156798 | A1 * | 5/2019 | Motohashi | G10H 1/46 |
| 2019/0180727 | A1 * | 6/2019 | Motohashi | G10H 3/146 |
| 2019/0186959 | A1 * | 6/2019 | Tanabe | G10H 3/146 |
| 2019/0213983 | A1 * | 7/2019 | Motohashi | G10D 13/20 |
| 2019/0213984 | A1 * | 7/2019 | Koizumi | H10N 30/80 |
| 2021/0056941 | A1 | 2/2021 | Chang | |
| 2021/0068194 | A1 | 3/2021 | Han et al. | |
| 2021/0225338 | A1 * | 7/2021 | Piscoi | G10H 3/10 |
| 2021/0225346 | A1 * | 7/2021 | Piscoi | G10D 13/26 |

FOREIGN PATENT DOCUMENTS

| | | | | |
|---|---|---|---|---|
| CN | 207124030 | | 3/2018 | |
| CN | 110462728 | | 11/2019 | |
| CN | 110462728 A | * | 11/2019 | G10D 13/02 |
| CN | 112309355 | | 2/2021 | |
| CN | 112309355 A | * | 2/2021 | G10D 13/063 |
| RO | 00130805 | | 6/2014 | |

OTHER PUBLICATIONS

Muzzio Drums, 'Electronic Drums'.
Muzzio Drums, 'Hybrid Drum'.
Pearl, 'e-Merge'.
Pearl, 'e-MERGE Powered by KORG'.
Office Action Issued in U.S. Appl. No. 17/153,819, dated Jun. 29, 2023.
International Search Report for App. No. PCT/US2021/014217; dated May 24, 2021.
International Written Opinion for App. No. PCT/US2021/014217; dated May 24, 2021.
H Nishikawa et al 2015 Journal of Physics: Conference Series.
Office Action of U.S. Appl. No. 17/153,819; dated Dec. 28, 2023.
Muzzio Drums, 'Electronic Drums', 2020.
Muzzio Drums, 'Hybrid Drum', 2020.
International Search Report for App. No. PCT/US2017/067605; dated Feb. 26, 2018.

(56) References Cited

OTHER PUBLICATIONS

International Search Report for App. No. PCT/US2018/13917; dated May 15, 2018.
International Written Opinion for App. No. PCT/US2017/067605; dated Feb. 26, 2018.
International Written Opinion for App. No. PCT/US2018/13917; dated May 15, 2018.
Office Action Issued in U.S. Appl. No. 18/363,621; dated Nov. 15, 2023.
Office Action Issued in U.S. Appl. No. 18/363,621; dated Oct. 4, 2023.
Office Action Issued in U.S. Appl. No. 17/153,819; dated Oct. 6, 2023.
International Search Report issued in International Application No. PCT/US2023/028353 dated Dec. 7, 2023.
International Written Opinion issued in International Application No. PCT/US2023/028353 dated Dec. 7, 2023.

* cited by examiner

FIG. 10B
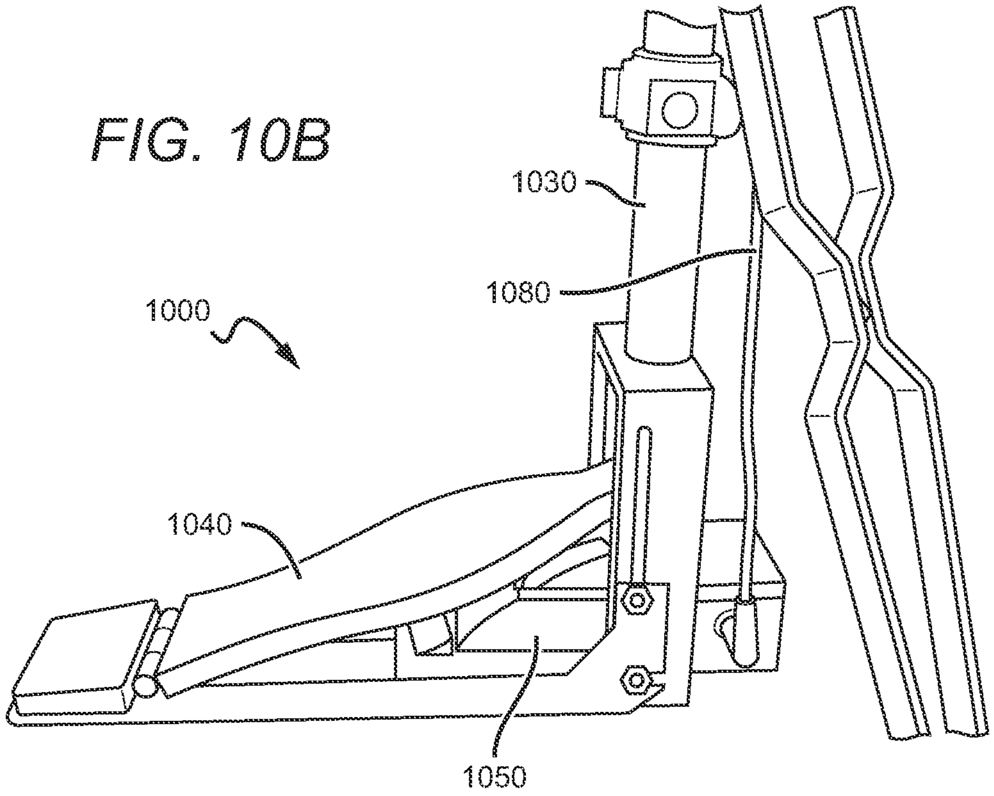
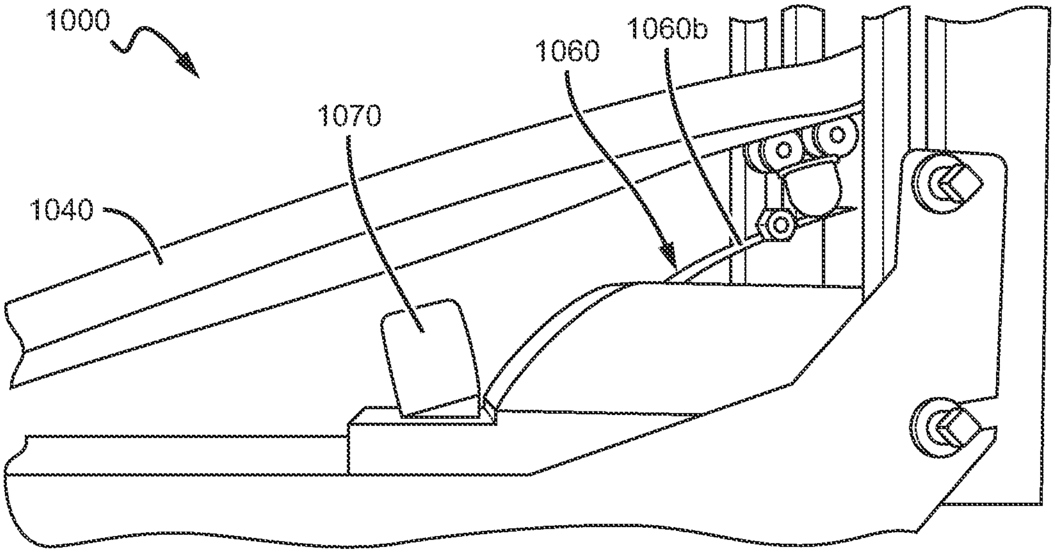
FIG. 10C

ELECTRONIC CYMBAL INSTRUMENTS AND SYSTEMS

REFERENCE TO RELATED APPLICATIONS

This application claims the priority benefit of U.S. Provisional Patent Application No. 62/963,504, filed on Jan. 20, 2020 and entitled "Electronic Musical Instruments," and the priority benefit of U.S. Provisional Patent Application No. 63/011,882, filed on Apr. 17, 2020 and entitled "Electronic Musical Instruments," both of which are fully incorporated by reference herein in their entireties. The concurrently filed PCT application, PCT App. No. PCT/US21/14217, filed on Jan. 20, 2021 and entitled "Electronic Musical Instruments and Systems" is also fully incorporated by reference herein in its entirety.

BACKGROUND OF THE DISCLOSURE

Field of the Disclosure

This disclosure relates generally to electronic musical instruments. More particularly, this disclosure relates to electronic percussion instruments such as tom toms, snare drums, bass drums, cymbals, and hi-hats, and/or to assemblies of instruments (e.g. percussion instruments), such as drum sets. Even more particularly, this disclosure relates to wireless electronic percussion instruments, and percussion instruments with interchangeable and/or removable components to change the instrument between a traditional percussion instrument (that relies on resonance and/or vibration to produce sound) and an electronic percussion instrument.

Description of the Related Art

Prior art wireless electronic drums suffer from latency issues, such that there is a noticeable delay between when an instrument is actuated and when the electronic sound is produced. Prior art wired electronic drums do not suffer from the same latency issues, but are cumbersome due to the requirement for one or more wired connections to each instrument (e.g., for power and/or connection to a sound module). Some examples of prior art wireless electronic percussion instruments, the components and concepts of which may also be incorporated into embodiments of the present disclosure, are shown and described in Romanian Pat. Pub. No. RO 130805A1 to Piscoi, filed on Jun. 30, 2014, the entire contents of which are fully incorporated by reference herein.

SUMMARY OF THE DISCLOSURE

One embodiment of a drum according to the present disclosure includes a drum shell with an inner wall, and an electronics portion within the inner wall. The electronics portion is attached to the drum shell, and includes a power source, one or more sensors configured to produce a sensor impulse upon actuation of the drum, a circuit for accepting sensor impulses from the one or more sensors, and a transmitter for sending instrument signals based on the sensor impulses.

Another embodiment of a drum according to the present disclosure includes a drum shell and a drumhead on the drum shell. The drum also includes one or more sensors, with at least one sensor connected to the underside of the drumhead to produce an impulse upon actuation of the drumhead. The drum also includes an electronic for accepting impulses from the one or more sensors and wirelessly sending an instrument signal to an external device. The electronic includes a circuit board and a transmitter.

One embodiment of an electronic musical instrument system according to the present disclosure includes a hub and one or more musical instruments. Each of the musical instruments includes a sensor configured to recognize an actuation of the musical instrument, an electronic, and a power source powering the electronic. The sensor is configured to produce an impulse in response to instrument actuation, and the electronic is configured to accept the sensor impulse and, in response, wirelessly transmit a signal to the hub.

One embodiment of a cymbal assembly according to the present disclosure includes a striking portion and an electronics portion under the striking portion. The electronics portion includes one or more force sensing sensors for recognizing a user moving edges of the striking portion and electronics portion closer together and producing a sensor impulse in response thereto, and also includes an electronic for accepting impulses from the one or more force sensing sensors.

Another embodiment of a cymbal assembly according to the present disclosure includes a striking portion and an electronics portion under the striking portion. The electronics portion includes a sensor module with one or more sensors for recognizing a user actuation of the striking portion and producing a sensor impulse in response thereto, and an electronics module for accepting sensor impulses from the sensor module. The electronics module is connected (e.g., detachably connected) to the sensor module.

One embodiment of a hi-hat assembly according to the present disclosure includes a top cymbal and a bottom cymbal. The assembly further includes a sensor, such as a sensor between the two cymbals and/or a sensor beneath the foot pedal, the sensor being configured to measure a variable corresponding to the distance between the top and bottom cymbals. In one specific embodiment, that variable is capacitance, and the sensor includes a capacitive lever.

This has outlined, rather broadly, the features and technical advantages of the present disclosure so that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

FIGS. 10A-10C are perspective views of another embodiment of a hi-hat assembly according to the present disclosure.

DETAILED DESCRIPTION OF THE DISCLOSURE

Figure 1:
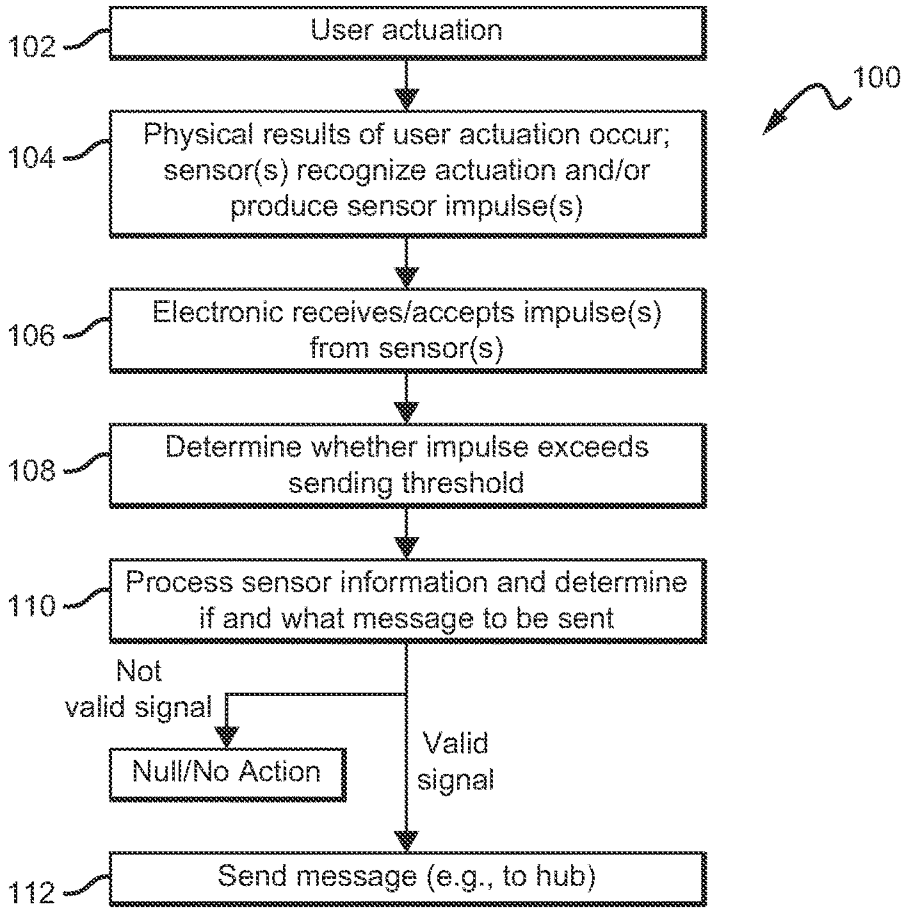
FIG. 1 is a flow chart showing steps according to one embodiment of the present disclosure.

This disclosure relates generally to electronic musical instruments. More particularly, this disclosure relates to electronic percussion instruments such as tom toms, snare drums, bass drums, cymbals, and hi-hats, and assemblies of instruments (e.g., percussion instruments), such as drum sets. Even more particularly, this disclosure relates to wireless electronic percussion instruments, and percussion instruments with interchangeable and/or removable components to change the instrument between a traditional percussion instrument (that relies on resonance and/or vibration to produce sound) and an electronic percussion instrument. The present disclosure also relates to electronic cymbal instruments, such as cymbal assemblies and hi-hat assemblies, some embodiments of which can be used in conjunction with a traditional acoustic metal cymbal.

It is understood that when an element is referred to as being "on" another element, it can be directly on the other element or intervening elements may also be present. Similarly, if an element is "attached to," "connected to," or similar, another element, it can be directly attached/connected to the other element or intervening elements may also be present. Furthermore, relative terms such as "inner", "outer", "upper", "top", "above", "lower", "bottom", "beneath", "below", and similar terms, may be used herein to describe a relationship of one element to another. Terms such as "higher", "lower", "wider", "narrower", and similar terms, may be used herein to describe angular and/or relative relationships. It is understood that these terms are intended to encompass different orientations of the elements or system in addition to the orientation depicted in the figures.

Although the terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure.

Embodiments of the disclosure are described herein with reference to view illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the disclosure.

Wireless Connection

Devices, systems, and methods according to the present disclosure can be designed to be wireless while also reducing/minimizing latency between a musician actuating an electronic instrument and a sound being produced. Musical instruments according to the present disclosure can include one or more sensors for sensing a user actuation, as well as a means for wirelessly transmitting messages to an outside source, or "hub." The hub serves as a location for receiving messages/signals from one or more such musical instruments, and converting those messages/signals into a format that is playable by one or more sound sources, such as speakers. For instance, the hub can convert the received message(s) into a MIDI note using the MIDI standard, though it is understood that other standards are possible. In other embodiments, user actuations can be converted on-site at and/or in each musical instrument into a format playable by a sound source (e.g., MIDI format).

In embodiments of the present disclosure, messages/signals can be sent using various specifications known in the art, such as the ZigBee specification. In one embodiment, the signal can be sent using a frequency-shift keying (FSK) frequency modulation scheme. One specific embodiment uses Bluetooth and/or FSK. While prior art plug-in (i.e., wired) modules have typically experienced latency in the range of 4-12 ms, embodiments of the present disclosure have experienced latencies of 20 ms or under, 15 ms or under, 12 ms or under, 10 ms or under, 8 ms or under, 6 ms or under, or even lower latency. It is understood that any signal sending specification with adequate latency performance could be used in embodiments of the present disclosure.

The hub can be connected to or part of a computer or instrument hardware module, or other device as is known in the art (e.g., a computer or a smartphone). In one embodiment, the hub is separate device connected to a computer (or other device as is known in the art, such as a smartphone), whether wirelessly or physically (such as via USB). The hub can then convert and/or send the received messages to the sound source, such as a speaker or headset, and/or to an intermediary, such as software (e.g., trigger interface software, virtual instrument software, virtual studio technology (VST) plugins, and/or other intermediaries). In some embodiments, the hub can convert the received messages to a format (e.g. MIDI) that is playable by a hardware-based sound module such that a computer and/or software are not needed. In some embodiments, the hub includes one or more receivers, and in one specific embodiment includes a single receiver (e.g., as part of a transceiver). In another embodiment, the hub includes more than one receiver (e.g., transceiver), thus allowing it to receive on more than one frequency at the same time without collisions. This can be particularly beneficial when a plurality of instruments are being used, and even more particularly beneficial when instruments within a system are transmitting on different frequencies than one another.

Instruments according to the present disclosure can include one or more sensors that are linked to an electronic conversion unit (hereinafter referred to as an "electronic" for simplicity), such as a circuit board, such as via wire connection. It is understood that the electronic may be a single physical element, or may be multiple elements working together. The electronic can include a transmitter and in some embodiments a receiver, which both may be included as a transceiver (the term "transceiver" being used hereinafter for simplicity, though it is understood that a separate receiver and/or transmitter may be used, and that a receiver may not be included).

FIG. 1 is a flow chart of a method 100 according to one embodiment of the present disclosure which can be utilized with various instruments according to the present disclosure, including the instruments specifically described below. It is understood that additional steps may be included, and/or steps may be omitted. Upon a user actuating an instrument (step 102), the actuation(s) (e.g., through the physical results of the actuation such as displacement of a drum head, vibration, etc.) are recognized by one or more sensors (step 104), which can produce a reaction (e.g., an impulse). The sensors can be linked (e.g. using one or more wires) to an electronic, such as the electronic 200 shown in FIG. 2 discussed in more detail below, though it is understood that other electronics could be used as would be understood by one of skill in the art. The electronic can receive/accept information (e.g., impulses) from the one or more sensors (step 106). The electronic can then perform a logical function (e.g., using a logic gate or software routine) to determine what, if any, message it should send based on the accepted information/impulse(s). In one specific embodiment of the present disclosure, the electronic determines, based upon one or more accepted impulses, 1) whether the impulse from a sensor(s) exceeds a minimum sending threshold (which can help prevent inadvertent transmission of unintended impulses) (step 108), and 2) if so, process the sensor information and determine if and what message/signal to send (step 110). The electronic can then send the determined message to the hub (step 112).

The system can be configured such that the hub, or another recipient-end element, sends an acknowledgment signal when the message from the electronic is received. The electronic can include a resend protocol such that if an acknowledgment message is not received within a certain period of time, the electronic resends the original message. In a preferred embodiment, the resend time (i.e., the time that passes after which the electronic will resend if it has not received an acknowledgment signal) is 1 ms or less. This cycle can be repeated until a pre-set timeout, after which the electronic would no longer attempt to send the original message. Due to the resend time being 1 ms or less, it would take multiple resend attempts before a human would be able to recognize that the original signal had not gone through.

The content of the message sent by the electronic can include information beyond that determined by the input from the sensors. For instance, in one embodiment, the message includes two primary components: 1) the inputs from the one or more sensors, and 2) an identifier of the sender (e.g., an identifier of the electronic 200 and/or an instrument with which the electronic is associated). The inclusion of the identifier enables the hub to recognize the sender of the message. The hub can, in some embodiments, use this identifier to determine the final sound produced. For instance, if a tom tom and a snare were struck in the exact same manner and produced identical sensor messages, the hub could cause to be produced a different sound (e.g., a tom sound or a snare sound) based on whether the identifier signal indicated that the message had come from an electronic associated with a tom or an electronic associated with a snare.

In one embodiment using the method described above, each signal produced by an actuation can be 25 bytes or less; or 20 bytes or less; or 15 bytes or less; or 10 bytes or less; or 5 bytes or less; or 3 bytes or less. These signal sizes result in reduced latency and/or a reduced likelihood of interference.

Multiple Instruments

In some embodiments of the present disclosure, a single hub is used to receive signals from multiple electronic instruments, and thus produce sounds (through one or more sound sources) from each of those instruments. For instance, a single hub can be used to receive signals from the various instruments of a drum set, such as 1) a snare drum, 2) one or more toms, 3) a bass drum, 4) a cymbal, and 5) a hi-hat.

Each electronic that is sending signals from an instrument as part of a system (e.g., a drum set) can transmit messages to the hub on the same frequency. Because of the relatively small size of each message as discussed above and/or because each message according to the present disclosure can be 250 μs or less in length, 200 μs or less in length, 150 μs or less in length, or less than 100 μs in length, there is a low chance of interference. Further, should two or more messages collide, the resend protocol will likely result in all messages being received with only a very slight delay that would not cause any noticeable change in sound production. The use of a single frequency for the sending of all messages from the various instruments of a drum set both a) lessens the chance of outside interference, and b) simplifies the system as a whole, in that multiple frequencies for each of various instruments are not being used.

In one embodiment, all messages sent to the hub by the various electronics of a drum set use a first frequency, while all acknowledgment messages sent by the hub use a second (different) frequency. This prevents the collision of data signals (from the electronics) and acknowledgment signals (from the hub). Generally speaking, this results in lower message failure than embodiments where the data signals and acknowledgment signals use the same frequency; however, it is understood that embodiments with the data and acknowledgment signals on the same frequency are possible.

Each individual instrument can include its own electronic. In one embodiment of the present disclosure, each of two or more electronics of a system (e.g., the electronics for different instruments of a drum set) can be set with a different resend time. This can stagger resends should two messages from respective electronics happen to interfere with one another, such as if a drummer were to actuate two instruments at the exact same time. If the resend protocols of the instruments were set with the exact same resend time, this could result in an interference loop, whereas staggering resend times results in the messages being sent at slightly different times and thus not interfering with one another.

Additionally, electronics according to the present disclosure can perform a check of the frequency prior to sending a signal. If the frequency is busy/being used already, then the electronic can delay sending for a short period of time (e.g., 1 ms or less) before either sending the signal or performing another check to see if the frequency is clear.

Electronic Conversion Unit

Figure 2:
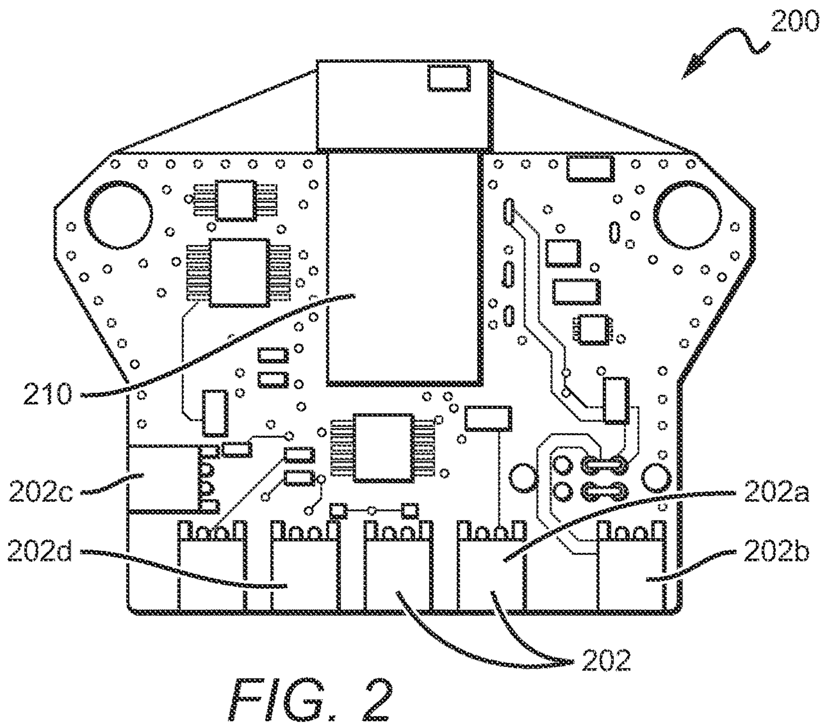
FIG. 2 is a perspective view of an electronic according to one embodiment of the present disclosure.

FIG. 2 shows one embodiment of an electronic 200 according to the present disclosure. It is understood that electronics other than that shown in FIG. 2 and specifically described below are possible.

The electronic 200 may be, for instance, a circuit board such as a PCB, such as in the embodiment shown. Terminals 202 (e.g. 202*a*-202*d*) may be configured to receive signals from different sensors. For example, the terminal 202*a* may be wired to accept sensor impulses caused by a strike on a drumhead, while the terminal 202*b* may be wired to accept impulses from drumhead vibration. In some other embodiments, the different terminals may be designed for different instruments. For instance, while the terminals 202*a*,202*b* may be designed for a snare drum, the terminal 202*c*,202*d* may be configured for connection to a hi-hat or cymbal assembly. In this way, the same electronic 200 can be used for many different percussion instruments, and in some embodiments the same type of electronic can be used for all of the percussion instruments in a drum set. The electronic 200 can include a module 210. The module 210 itself can include any combination, with or without additional components, of 1) a transceiver (such as a 2.4 GHz or 5 GHz FSK transceiver), 2) a signal booster, 3) an antenna, and 4) a shield to protect from interference. It is understood that while embodiments of the present disclosure often refer to the electronic 200, other types of electronics could be used as would be understood by one of skill in the art in light of the present disclosure.

Interchangeability

Instruments (such as percussion instruments) according to the present disclosure can have interchangeable and/or removable parts such that they can be used as an electronic instrument or an acoustic instrument. For instance, the percussion instrument can have a drumhead or a set of drumheads (or other striking surfaces) that is/are relatively quiet when struck, such as mesh, PET, polyester, or rubber drumheads (or other materials as known in the art, such as those traditionally used with electronic drums), for use when the drum is in electronic mode and/or when electronic components are in place; and a drumhead or set of traditional drumheads made of traditional acoustic materials, such as Mylar and plastics, or other materials known in the art, for use when the drum is in acoustic mode and/or when electronic components are not in place. It should be understood that the above materials listings are exemplary in nature and not limiting; for instance, in certain instances, a material described above as a typical electronic material may be used as an acoustic material, and vice versa, depending on user choice. These concepts can be applied to, for example, snare drums, tom toms, bass drums, congas, bongos, timbales, timpani/tympani/kettle drum(s), cymbals, hi-hats, and other instruments as would be understood by one of skill in the art.

It is understood that the electronics could also be used with a traditional drumhead, such that the sound produced by actuation would be the combination of a traditional acoustic sound and an electronic sound. It is further understood that the electronics portion could remain in place and/or attached to the drum but be inactive, so that when a traditional drumhead is used, an acoustic sound is produced without any electronic sound. The electronics portion can be mechanically designed so as to, to the extent possible, avoid interfering with the acoustic sound when the electronics portion is "off." For instance, the electronics portion of a snare drum such as the snare drum 300 (discussed in detail below) can contact less than 20% of the inner wall area of a drum shell, less than 10% of the inner wall area of the drum shell, less than 5% of the inner wall area of the drum shell, less than 2.5% of the inner wall area of the drum shell, less than 1% of the inner wall area of the drum shell, or less. The contact with the inner wall area of the drum shell can, in some embodiments, be substantially symmetrical about the radius of the drum shell.

Drum Examples

Below are specific embodiments of drums incorporating elements and concepts of the present disclosure. It is understood, however, that the elements and concepts described with respect to each example are not specifically limited to that type of instrument. For instance, the electronics portion 500 described with regard to the snare drum 300 can be used in other instruments such as the bass drum 600; the dampening concept described with regard to the bass drum 600 can be used with other types of drums such as the snare drum 300; etc. Many different embodiments are possible as would be understood by one of skill in the art.

Example 1: Snare Drum

Figure 3:
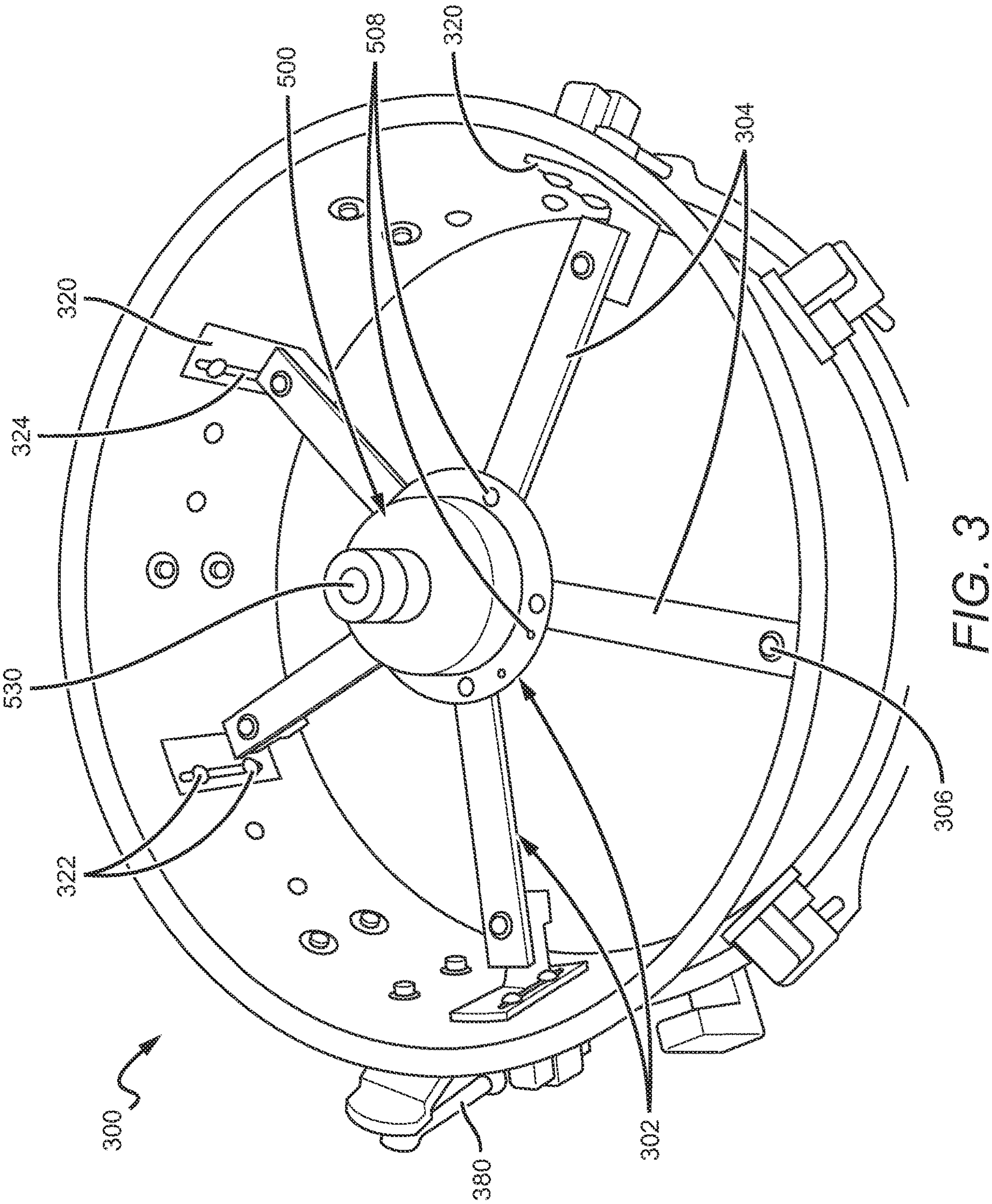
FIG. 3 is a top perspective view of a snare drum according to one embodiment of the present disclosure, with the top drumhead removed.

FIG. 3 shows a snare drum 300 (with the top drumhead removed for viewing purposes) that can incorporate the above-described wireless technology, electronics, and/or interchangeability concepts. The drum 300 includes a trigger platform 302. The trigger platform 302 can include a plurality of arms 304 or another type of support structure, and an electronics portion, electronics module, and/or trigger box 500 (shown by itself in FIGS. 5A-5F, and hereinafter referred to as an "electronics portion" for simplicity).

The electronics portion 500 can be below the top drumhead and/or approximately in the center of the drum 300, and/or be connected to the drum body by the arms 304 and/or other components, such as the brackets 320 (which will be discussed in further detail below). The electronics portion 500 can include multiple connection holes 508 (some of which are not in use in FIG. 3) so as to be able to accommodate various different shell and/or lug configurations. The trigger platform 302 and the components thereof, such as the arms 304 and the body of the electronics portion 500, can be made of the same material or a multitude of materials, such as but not limited to plastic, metal (e.g., aluminum), wood, and/or other materials as known in the art.

The drum 300 can include brackets 320. The brackets 320 can be attached to an inner wall of the drum 300. Each bracket 320 can connect to one of the arms 304 of the trigger platform 302, as shown, such as using drum screws 306 and/or other connectors. The brackets 320 can have an adjustable height with respect to the inner wall of the drum 300, which can make the drum 300 adaptable to different components. For instance, as shown in FIG. 3, when the screws 322 are loosened the brackets 320 can be moved up or down before the screws 322 are again placed through the height apertures 324.

In FIG. 3, a relatively quiet drumhead (e.g., a PET drumhead) could be placed on the drum 300 as shown, and the drum 300 would be in electronic mode. Alternatively, a user could remove the trigger platform 302 by unscrewing the connectors 306 and pulling the trigger platform 302 out from the inside of the drum, and then connecting an acoustic drumhead (e.g., a Mylar and/or plastic drum head) to the sidewall of the drum 300. The drum 300 can include all components of a traditional drum, such as drum lugs, tensioning screws, etc., so as to be fully operational as a traditional drum when a traditional drumhead is installed. It is understood that an acoustic drumhead could also be used in conjunction with the electronic components and/or when the drum 300 is in electronic mode.

Figure 4A:
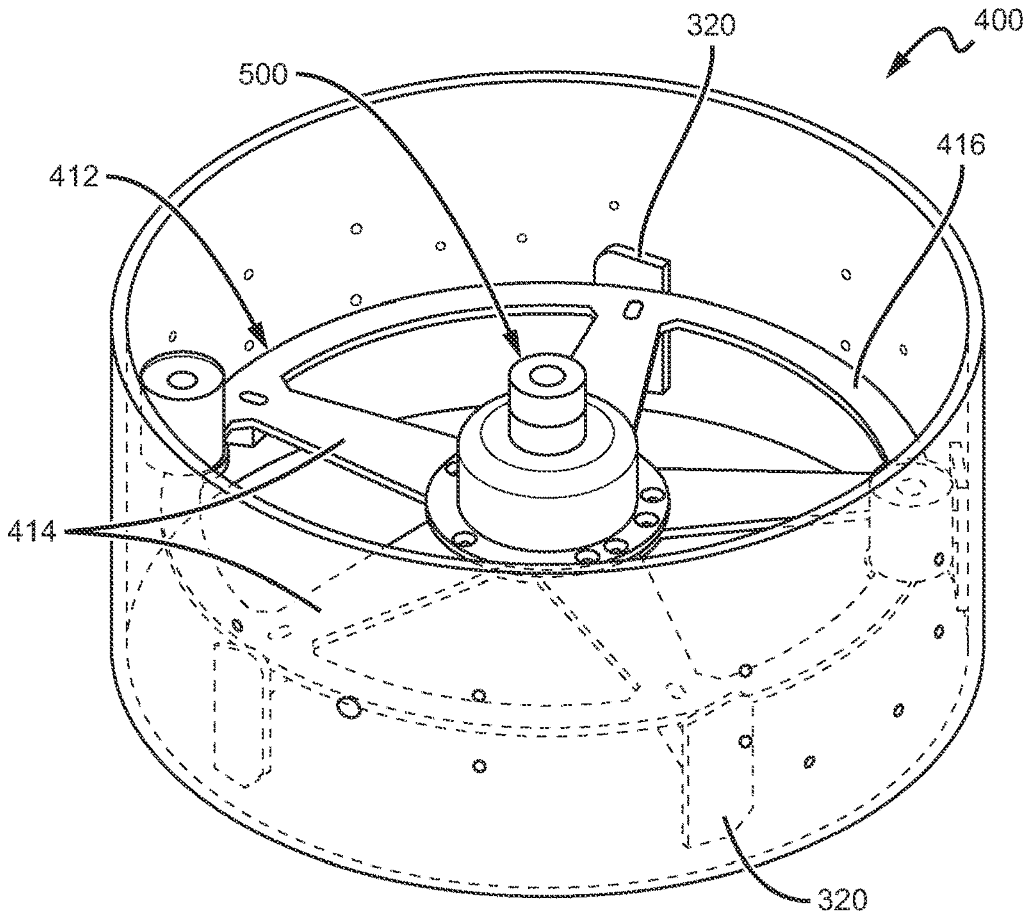
FIGS. 4A and 4B are top perspective and exploded top perspective views, respectively, of portions of a snare drum according to another embodiment of the present disclosure.
Figure 5A:
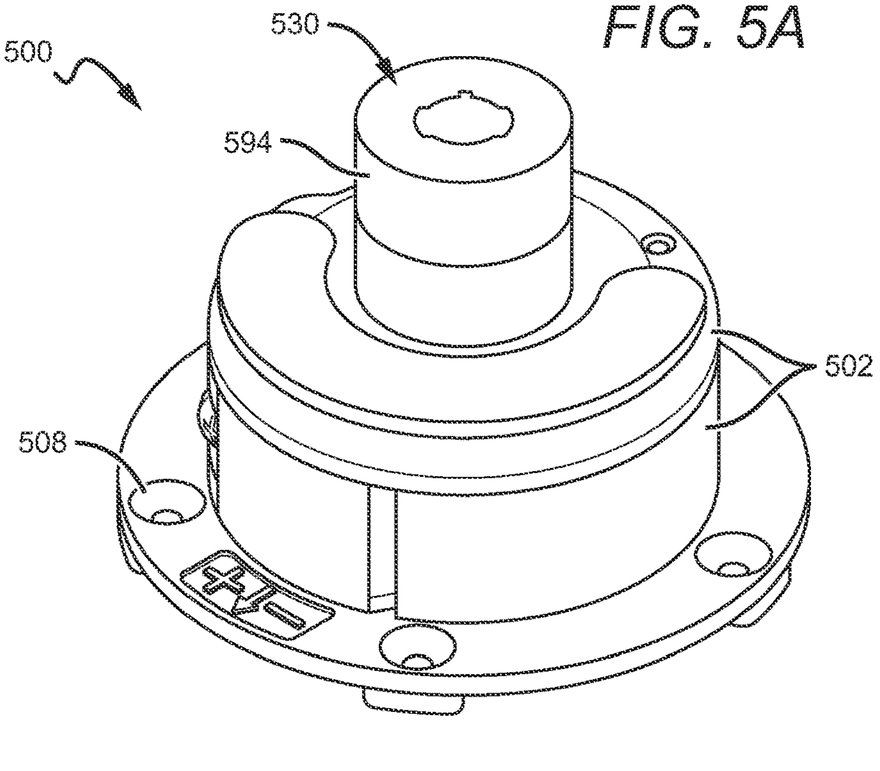
FIGS. 5A-5F are various perspective views of an electronics portion according to one embodiment of the present disclosure.
Figure 4B:
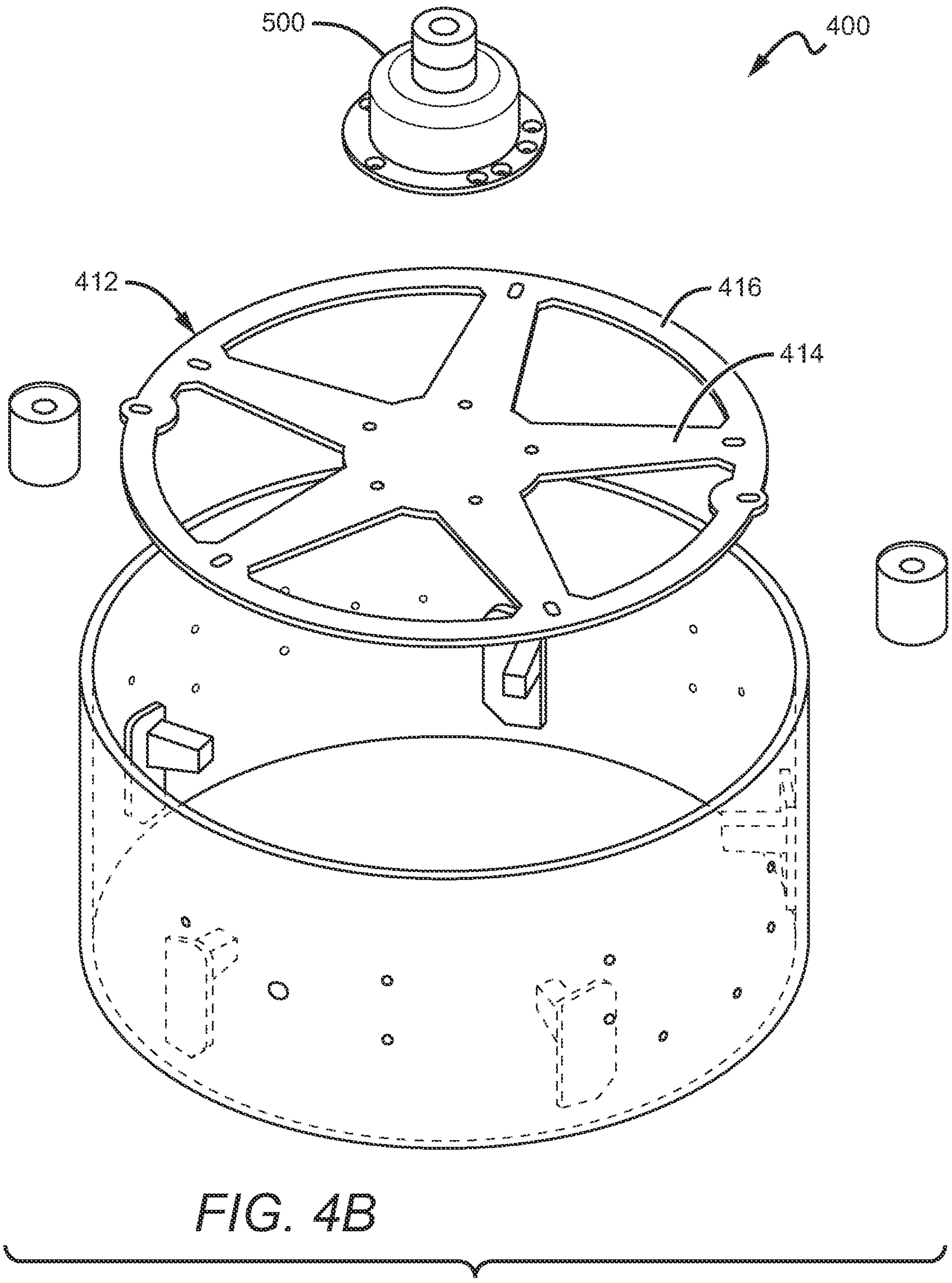

In some embodiments, instead of or in addition to arms 304, a support structure such as a circular support structure (e.g., a plate or disc) can be used (e.g., as part of a trigger tray), which can connect to the inner drum shell wall and/or to other components such as the brackets 320. For instance, FIGS. 4A and 4B (with equivalent reference numerals used for substantially equivalent or equivalent structures) show a drum 400 including a support structure 412 which can be circular and can operate similarly to the arms 304 from the drum 300. The support structure 412 can include arms 414 and an outer ring 416, which can enhance stability as well as ease of installation and removal. Instead of individual arms 304 connecting to the brackets 320, the single support structure 412/outer ring 416 connects to multiple brackets 320. Other support structure designs are possible, including but not limited to solid circular support structures.

It is understood that while the above interchangeability concepts have been described with regard to the snare drums 300,400, they could be applied to other instruments, such as but not limited to tom toms and bass drums (such as the bass drum 600 shown in FIGS. 6A-6C and described below).

Electronics Portion

FIGS. 5A-5F show various views of the electronics portion 500. The electronics portion 500 be used for receiving signals from one or more sensors, and relaying those signals to a hub. The electronics portion 500 can include an electronic similar to or the same as the electronic 200 (FIG. 2), and can be used to accomplish the steps of the method 100 (FIG. 1).

The wireless format of the present disclosure also has distinct advantages over prior art wireless devices, such as wireless microphones. The system, such as the system 300, can be powered by a local and/or self-contained source (though it is understood that other embodiments are possible). For instance, the system can be powered by batteries 504, which can be removable/replaceable. In the embodiment shown, the batteries 504 can be included in the electronics portion 500, such as within a main body or housing 502 of the electronics portion 500. The electronic 200 can be proximate and/or in the same location as the batteries 504, such as within the main body 502 of the electronics portion, to allow for simple powering of the electronic 200. The electronics portion 500 can be configured such that battery power (and/or whatever other power source is being utilized) is only used when the drum is struck and for a short time thereafter; after which, the electronics portion 500 can reduce power usage, such as going into a low power mode and/or a dormant mode and/or being turned "off," resulting in an energy savings over prior art wireless devices. In some embodiments, the battery usage is subject to at least two levels of low power mode: a first reduced power mode between the production of signals, and a second, lower reduced power mode that is triggered when no signals are produced for a certain period of time (i.e., a "sleep" mode). This is in contrast to prior art methods employed by, for example, typical wireless microphones, which send a continuous signal and thus require continuous power usage (instead of sending discrete signals). Moreover, continuous signals, such as those used by prior art wireless microphones, are more susceptible to interference.

In this and other embodiments of the present disclosure, it should be understood that power sources other than batteries 504 are possible, including but not limited to energy harvesting power sources, such as by using ambient background energy. Any type of power source can be used, including but not limited to photovoltaic, piezoelectric, solar, electrostatic, magnetic, thermoelectric, solar, pyroelectric, energy harvesting (e.g. using ambient background energy, kinetic energy, etc.) etc. This type of powering is made possible and/or enhanced at least in part by the relatively low power requirement due to the discrete power usage described above (as opposed to the continuous power usage of, e.g., a wireless microphone). Generally, a locally mounted power source such as batteries is beneficial in that it eliminates the need for a wired connection. However, wired power connections are also possible (even if the signals from actuation are sent wirelessly). Any type of power is possible.

The electronics portion(s) of instruments according to the present disclosure, including but not limited to the electronic portions 500, can receive updates electronically and wirelessly such that they never need to be connected via wire to another device.

Trigger Sensor(s)

In the specific embodiment of FIG. 3 shown, a single first sensor (or "trigger") 530 is shown. The first sensor 530 can be, for instance, a piezoelectric sensor, or another type of sensor as known in the art. The first sensor 530 can be used for sensing when and how the drum 300 (or other drum to which the sensor is connected) is struck, including sensing, for example, how hard the drum 300 is struck, and/or different zones and different methods of striking. The trigger can be in physical contact with and/or otherwise connected to the underside of the top drumhead. For instance, the top of the electronics portion 500 as shown could be or include the trigger 530 which could abut the bottom of the top drumhead, or the electronics portion could be connected, such as via one or more wires, to a trigger 530 that is attached to the bottom of the top drumhead. The trigger 530 can primarily be used to sense when and how a user actuates the top drumhead using his or her drumsticks.

In some embodiments, multiple triggers (such as the trigger 530) can be used. For instance, in one embodiment, one central trigger 530 (which can be in the middle of the drum) can be surrounded by two, three, four, or more secondary triggers, which can be equidistant from the central trigger 530. The secondary triggers can be placed radially around the central trigger 530. In one embodiment, they are approximately halfway from the central trigger 530 to the drum shell; in another embodiment, they are approximately halfway or more from the central trigger 530 to the shell; in another embodiment, they are less than halfway from the central trigger 530 to the shell. Additionally, embodiments not including a central trigger 530 are possible. For instance, two (or three, four, or more) triggers centered about the drumhead could be used, such as radially located triggers. The triggers can be used both to detect the force of a strike, and/or to detect its position (e.g., via triangulation, or other methods known in the art). These secondary sensors/triggers can be connected to the electronics portion 500, such as via wire(s), wirelessly, or as otherwise would be understood by one of skill in the art. The secondary sensors/triggers can be piezoelectric sensors or other sensors as known in the art.

The addition of a second trigger in addition to the first trigger can help to prevent a "hotspot" where more volume is produced when the drumhead is struck near the single trigger, and can also assist in sensing where the drumhead is struck (i.e., in what "zone" the drumhead is struck). Similarly, a third trigger can prevent hotspots over a two-trigger embodiment, etc. Finally, sensor location arrangements can benefit from being symmetrical about the center of the drumhead, though it is understood that asymmetrical arrangements are also possible. Some specifically contemplated embodiments include 1) a central trigger with two other triggers on diametrically opposing sides of the central trigger; 2) a central trigger with three other triggers substantially forming a triangle about the central trigger; 3) a triangular formation of secondary triggers (with or without a central trigger); and 4) a square or diamond-shaped formation of secondary triggers (with or without a central trigger). Many different embodiments are possible.

The central trigger 530 and additional sensors can be connected in parallel with one another, as opposed to acting independently. In other embodiments, the central trigger 530 is independent while two or more side sensors are connected with each other in parallel. A mean/average of sensing values can be used with the parallel connected sensors, which can also aid in hotspot reduction. In other embodiments, the triggers are not connected in series or in parallel to one another, but instead act independently.

It is understood that numerous different types of triggers and/or trigger materials can be used. For instance, some alternative trigger materials that can be used in embodiments of the present disclosure include force sensitive ("FS") sensors, such as force sensitive resistor ("FSR") sensors, smart fabrics, and other materials.

Vibration Sensor(s)

The electronics portion 500 can include one or more additional sensors beyond the first sensor 530 and one or more secondary drumhead triggers. For instance, a second sensor (or group of sensors) can be included as part of the electronics portion 500, such as a sensor included within the main body or housing 502 of the electronics portion 500. The second sensor can be used for a multitude or purposes. In the embodiment shown, the first sensor 530 is used to detect a strike on the head of the drum, while the second sensor detects vibrations of the drum shell. The second sensor can be mechanically linked to the drum shell for this purpose, such as via components of the trigger tray (e.g., the arms 304, support structure 412). In this embodiment and other embodiments, the second sensor can be used to detect, for example, rim shots and/or cross-sticks, where a user causes vibration of the rim. It is understood that other sensor locations for sensing vibration and/or rim strikes are possible. The vibration sensor(s) can be a piezoelectric sensor or other type of sensor as known in the art. In one embodiment, the vibration sensor(s) is included within and/or as part of the electronics portion 500, though many different embodiments and locations are possible.

Pressure Sensor(s)

Sensing can also be used to recognize the presence of pressure on the top drumhead, such as the presence of a user's hand on the top drumhead. For instance, a force sensing sensor (referred to herein as an "FS sensor") (e.g., a force-sensing resistor ("FSR") sensor) can be utilized for this purpose. One or more FS sensors can be placed on the top drum head, such as on the bottom of the top drum head, and can be used to sense when a user applies pressure to the top surface of the drum head. Upon user actuation, the electronics (such as the electronic 200, described above) can recognize a signal sent by the FS sensor, indicating whether (and in some instances, how much) pressure has been applied to the top drum head (such as by a user's hand). The electronic (e.g., the electronic 200) can then adjust the signal produced based on the inputs from the FS sensor so as to produce a different sound than if no pressure were sensed. While these embodiments are described herein with regard to FS sensors, it is understood that other types of sensors that measure force, displacement, and/or pressure could be used.

Figure 5B:
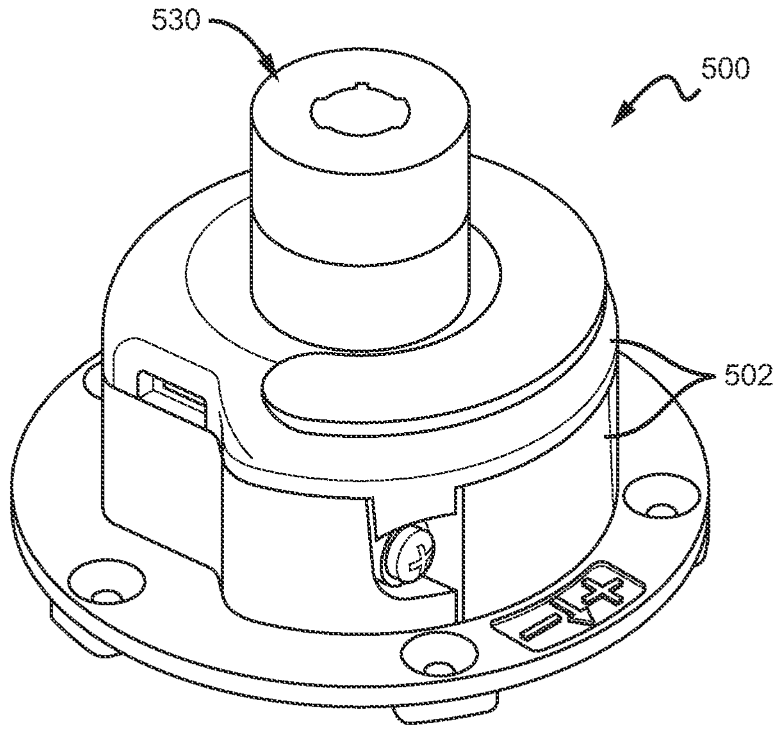
Figure 5C:
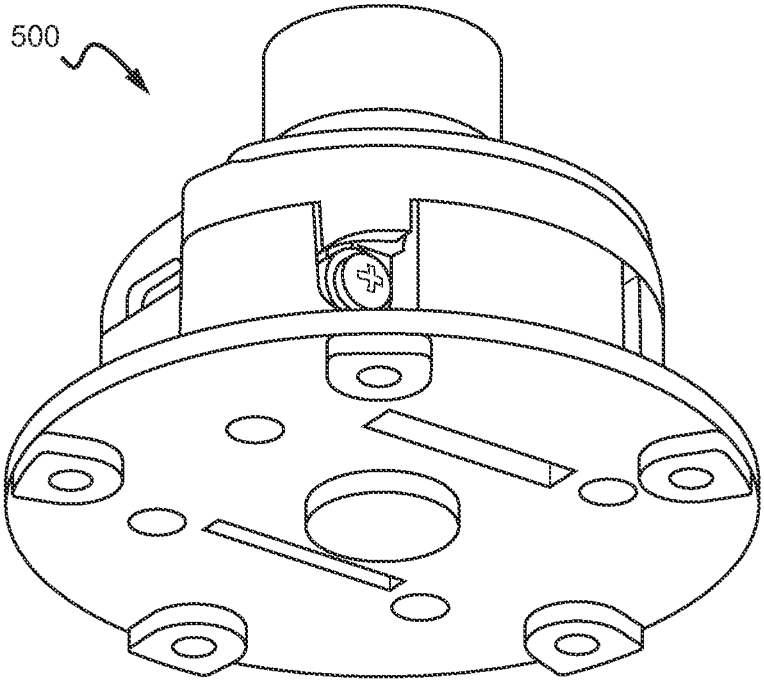
Figure 5D:
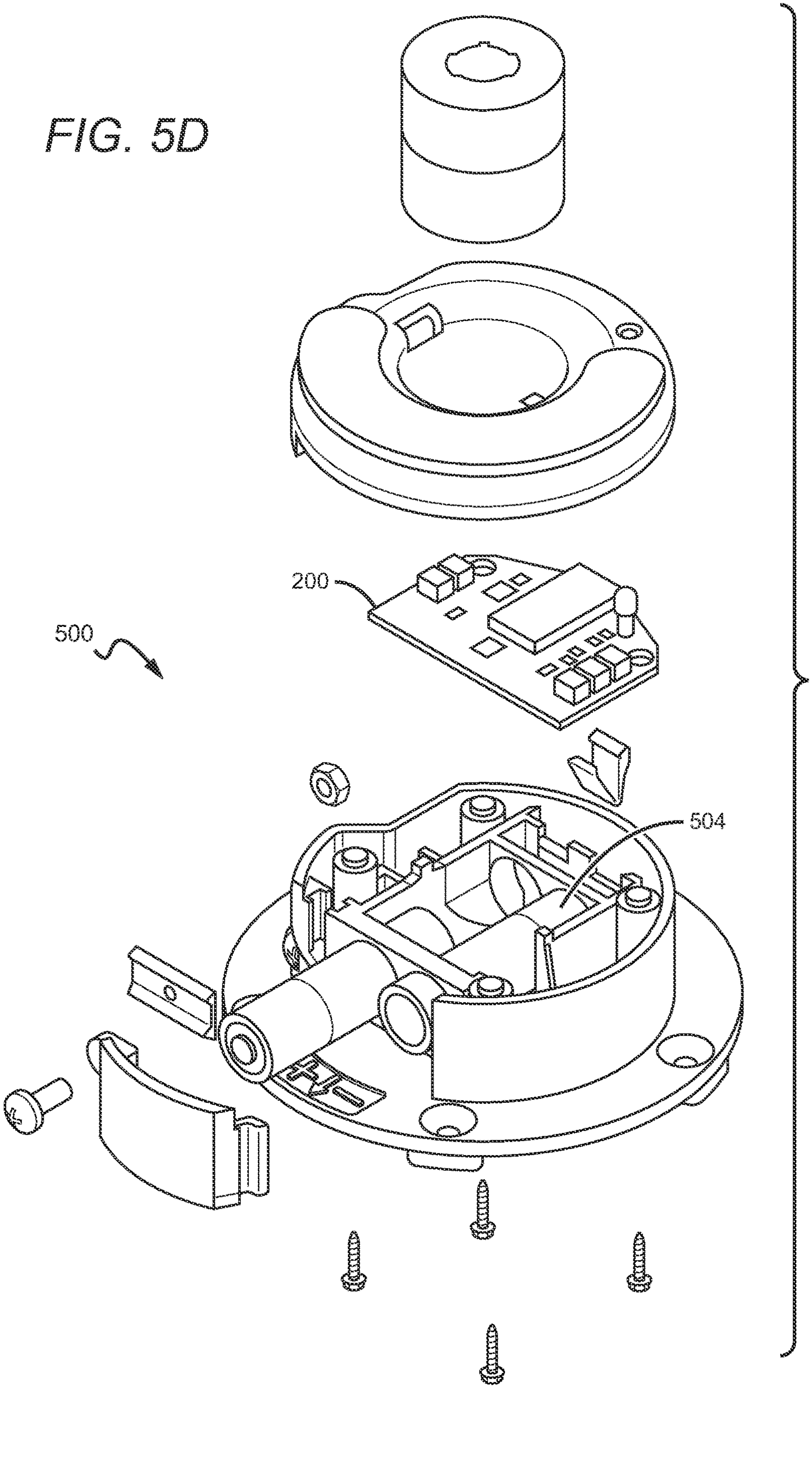
Figure 5E:
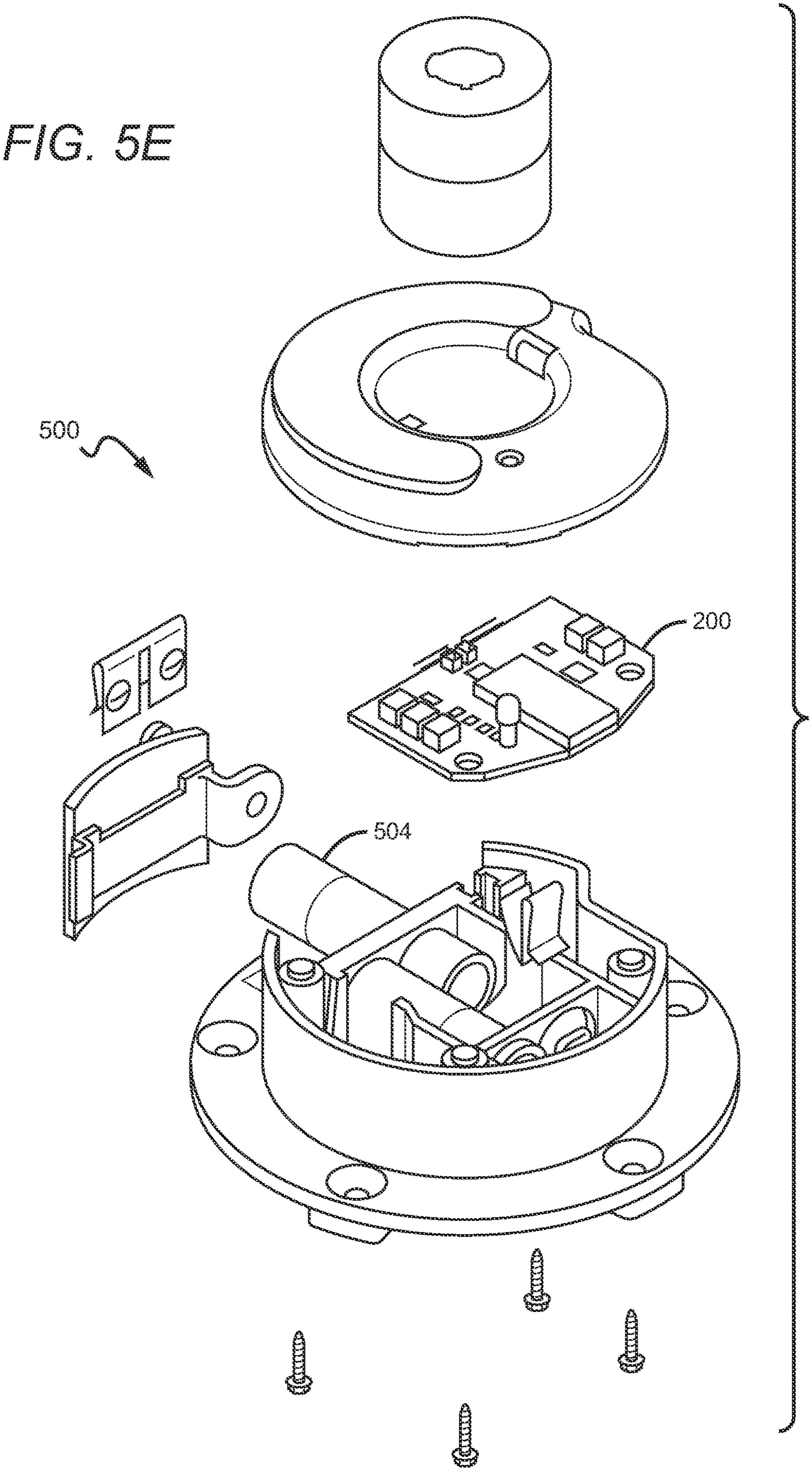
Figure 5F:
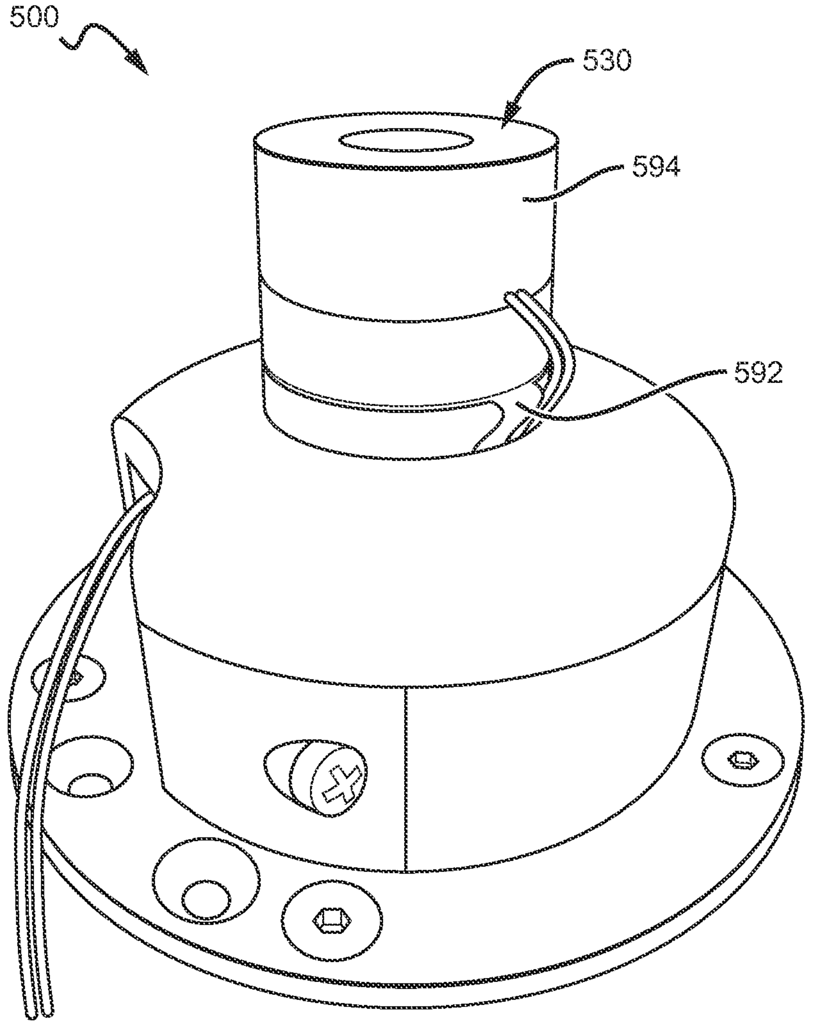

FIG. 5F shows one example of an electronics portion 500 that uses FS technology. The electronics portion 500 can include an FS sensor 592 that is included as part of, within, below, near, and/or otherwise proximate to the trigger 530, though it is understood that other embodiments with the FS sensor 592 not proximate the trigger 530 are possible, such as when an FS sensor is placed directly on the bottom of the drumhead. In the specific embodiment shown, the FS sensor 592 is an FSR sensor, and it understood that in all instances in the present disclosure where the phrase "FS sensor" is used, such sensor could be an FSR sensor.

In the specific embodiment shown, the FS sensor 592 is below one or more foam components 594 of the electronics portion 500, such as between pieces of foam or on the base of the top of the lid of the electronics portion 500 and/or beneath the foam components, though many different locations are possible. When a user places his or her hand on the top drumhead, the top of the electronics portion 500 is pressed downward, thus activating the FS sensor 592. The pressure of the user's hand (or other similarly applied pressure) is typically more than the pressure of, for instance, a strike upon the drumhead using a drum stick. Thus, the sensing of the FS sensor can determine whether or not a user's hand is on the drumhead and send a message and/or impulse accordingly, and the electronic components can utilize this input to adjust the produced sound accordingly. For instance, in one embodiment, the FS sensor can be used to differentiate between when a user plays a cross stick (a drumming technique whereby a user applies pressure to the drumhead while also striking the rim of the drum with a drumstick) versus when a user plays a rimshot (a drumming technique whereby the user strikes both the head and rim with the drumstick). The differentiation in the signal can be used by the electronic components, such as the electronic 200, in order to determine the type of sound that should be produced (e.g., a cross stick sound versus a rimshot sound). It should be understood that many other different usages and locations of FS sensors according to the present disclosure are possible, and that pressure sensors other than FS/FSR sensors can be used.

Electronic Throw-Off and Snare Tension Adjustment

Prior art acoustic snare drums often include a "throw-off," such as the throw-off 380 shown in FIG. 3. Some prior art throw-offs are described, for example, in U.S. Pat. No. 5,616,875 to Lombardi and U.S. Pat. No. 7,902,444 to Good et al., each of which is fully incorporated by reference herein in its entirety. Generally, a snare drum includes a series of stiff wires (i.e., a "snare" with "snare wires") that are held against the bottom drumhead. These wires produce the characteristic "snare" sound when the drum is struck. The snare is held against the bottom drum head by tension when the throw-off (e.g., the throw-off lever) is in a first position (typically an upward position), and can be removed from the bottom head by placing the throw-off in a second position (typically a downward position). Thus, when the throw-off is in the second position, the snare drum produces a different sound than when the throw-off is in the first position.

In some embodiments of snare drums according to the present disclosure, a sensor can be included so as to sense the position of the throw-off 380. In one specific embodiment, a sensor informs the electronics (e.g., the electronics portion 500 and/or electronic 200) of the position that the throw-off is physically in (e.g., using an electronic switch), and the electronics thus adjust the produced signal based on that position. For instance, if the throw-off is sensed to be in the "upward" position such that the snare of an acoustic drum would be held against the bottom head, the signal(s)

produced upon actuation of the drum will produce a sound customary of a snare drum; whereas if the throw-off is sensed to be in a “downward” position, the signal(s) produced upon actuation will produce a sound that is more typical of a tom). The sensor can be, for instance, a switch, a potentiometer, a proximity sensor, or any other variable or switched sensor that is capable of determining physical position.

Additionally, when the snare is in contact with the bottom head, the amount of contact can be fine-tuned using a tension adjuster such as a lever or joystick, so as to fine tune the sound produced by the snare drum. Some such devices and methods are described in U.S. Pat. No. 8,143,507 to Good et al., which is fully incorporated by reference herein in its entirety. Movement of the lever or joystick may also result in the removal of the snare from the bottom head, resulting in the same sound as if the throw-off had been put into the “off” position. As with the throw-off, one or more of the previously-described sensors can be used in conjunction with the tension adjuster to sense its position, and adjust the signal produced upon actuation so as to reflect the position of the tension adjuster.

While the above describes switched embodiments, it is understood that continuous controller embodiments (which sense actual position, as opposed to being “on” or “off”) are also possible and contemplated in embodiments of the present disclosure. Such sensors can be used to determine, for instance, how tightly a snare is being held against the bottom drumhead, which can cause differentiation in the sounds to be produced.

Example 2: Tom Tom

Tom tom drums are mechanically very similar in nature to snare drums, though they do not include a snare or accompanying components (e.g., throw-off and snare adjustment lever). Thus, a tom tom drum according to the present disclosure could include any of the trigger sensors, vibration sensors, and/or pressure sensors described above with regard to the snare drum. The concepts and components described above with regard to a snare drum could be applied to a tom tom drum (or similar) as would be understood by one of skill in the art.

Example 3: Bass Drum

Figure 6A:
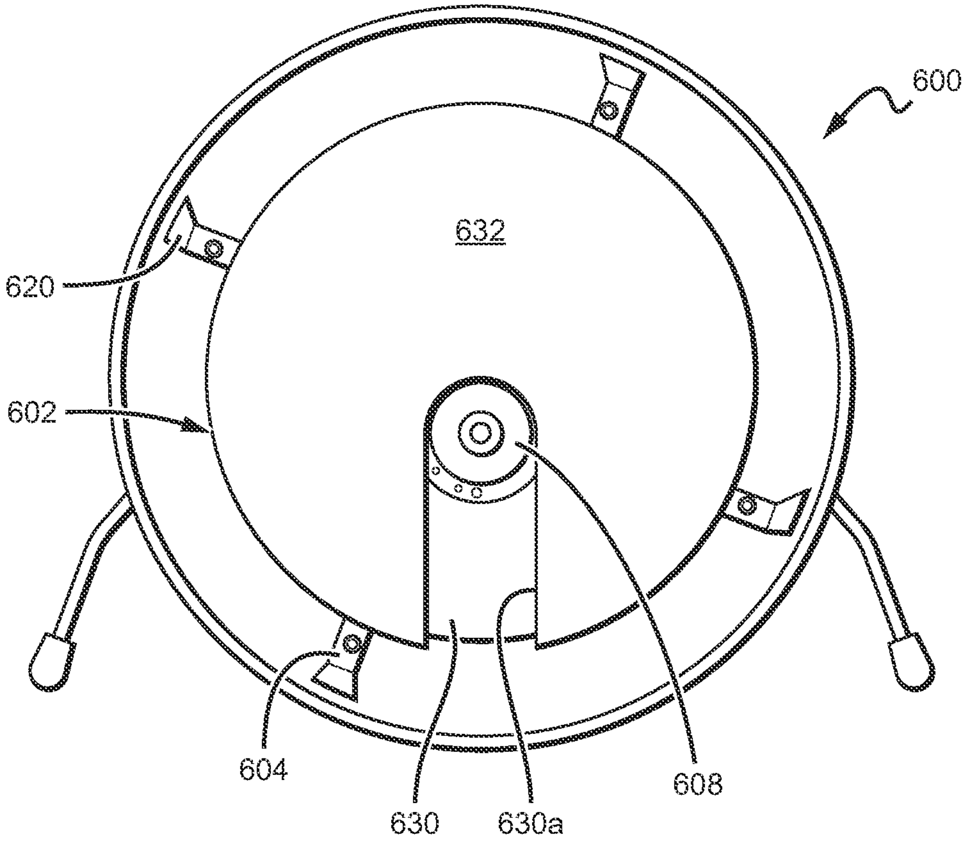
FIGS. 6A and 6B are rear perspective and bottom rear perspective views, respectively, of a bass drum according to one embodiment of the present disclosure, with the rear drumhead removed.
Figure 6B:
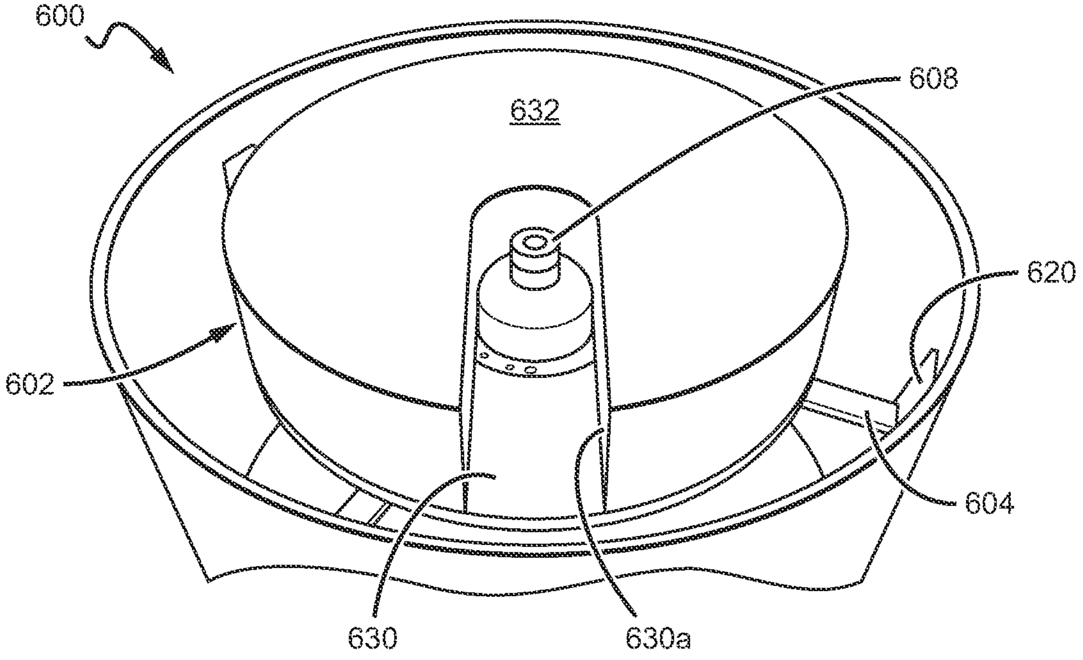
Figure 6C:
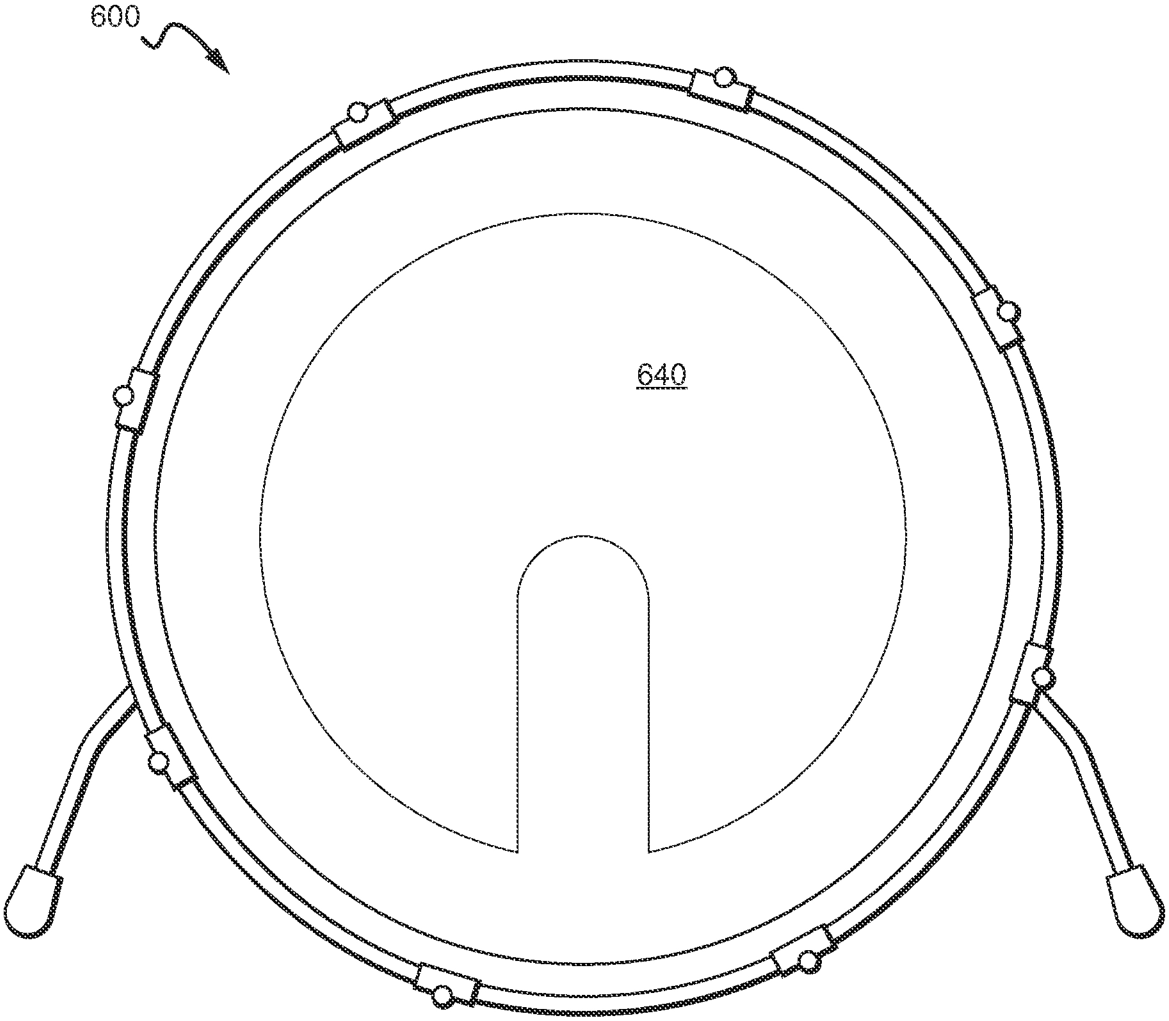
FIG. 6C is a rear perspective view of the bass drum shown in FIGS. 6A and 6B, with the rear drumhead.

FIGS. 6A-6C show a drum 600 according to one embodiment of the present disclosure, in this specific case, a bass drum. The drum 600 can include many components similar to and/or the same as the drum 300 from FIG. 3.

The drum 600 can include a trigger platform 602, which can include arms 604 and an electronics portion 608. The electronics portion 608 may be in the center, or may be off-center as shown, such as being horizontally centered but below the vertical midpoint of the rear drumhead (not shown in FIGS. 2 and 3, element 640 in FIG. 4) so as to more closely match where a drum beater will typically strike the rear drumhead. Other locations are also possible. The electronics portion 608 can include and/or be connected one or more sensors as described with the electronics portion 500, and can be in contact with and/or connected to the inner side of the rear drumhead.

The drum 600 can also include brackets 620, and the arms 604 and brackets 620 can be similar to the arms 304 and brackets 320 and/or connected in a similar or the same way. The arms 604 (and the arms 304 from FIG. 3) can be pivotable with relation to the substrate 630 and/or electronics portion 608, and in some embodiments the arms 604 can have an adjustable length. One or both of these features can be used to adjust the position of the electronics portion 608 and/or substrate 630 with relation to the body and/or drum shell of the drum 600. Additionally, the trigger platform 602 can include a substrate 630 on which the electronics portion 608 is mounted. The substrate 630 can be, for instance, disc-shaped. In this case, the substrate 630 is a wood disc that is circular. The arms 604 can connect to the substrate 630, or in some embodiments (such as embodiments where a substrate is not used) can connect to the electronics portion 608. Similar to the support structure 412 from FIGS. 4A and 4B, in an alternative embodiment, a support structure with an outer ring (similar to the outer ring 416) can be used.

Figure 6D:
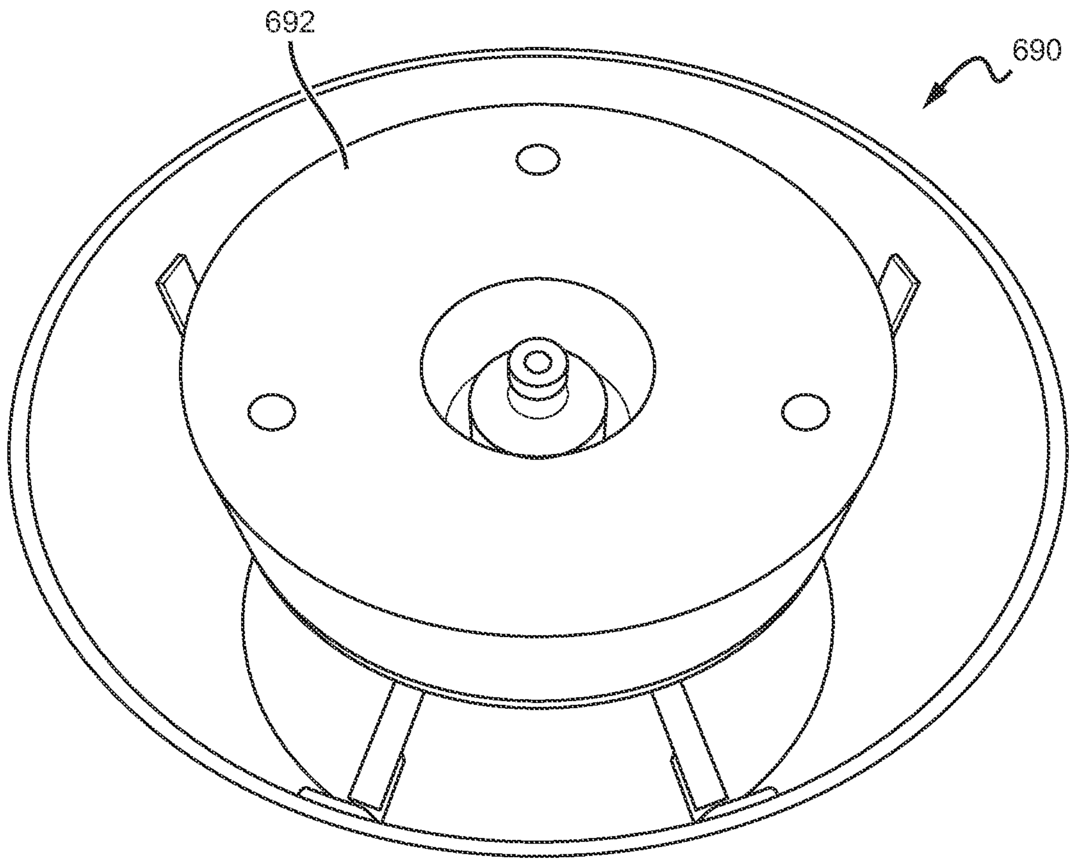
FIG. 6D is a bottom rear perspective view of another embodiment of a bass drum according to the present disclosure, with the rear drumhead removed.

The trigger platform 602 can also include a dampener 632 designed to abut the surface of the rear drumhead. The dampener can be between the substrate 630 and the rear drumhead in embodiments where the substrate 630 is present, such that the substrate 630 provides support for the dampener 632 (though some embodiments include a dampener but not a substrate), and the dampener 632 can directly abut the substrate and/or the rear drumhead in some embodiments. The dampener can be, for example, foam, rubber, and/or other materials known in the art, and can be one integral piece (as shown) or multiple pieces. The dampener can be attached in manners known in the art, such as being attached to the substrate 630 using posts, male/female attachments, fasteners, and/or adhesives; many different embodiments are possible. The dampener 632 can cover and/or be in contact with 5% or more of the rear drumhead's inner surface, 10% or more of the rear drumhead's inner surface, 25% or more of the rear drumhead's inner surface, 33% or more of the rear drumhead's inner surface, 50% or more of the rear drumhead's inner surface, 66% or more of the rear drumhead's inner surface, 75% or more of the rear drumhead's inner surface, 90% or more of the rear drumhead's inner surface, or more. The dampener 632 can have an area of 5% or more of the rear drumhead area, 10% or more of the rear drumhead area, 25% or more of the rear drumhead area, 33% or more of the rear drumhead area, 50% or more of the rear drumhead area, 66% or more of the rear drumhead area, 75% or more of the rear drumhead area, 90% or more of the rear drumhead area, or more. The dampener 632 can be approximately circular as is shown in FIGS. 6A-6C, and/or can have a radius that is 5% or more of the radius of the rear drumhead, 10% or more of the radius of the rear drumhead, 25% or more of the radius of the rear drumhead, 33% or more of the radius of the rear drumhead, 50% or more of the radius of the rear drumhead, 66% or more of the radius of the rear drumhead, 75% or more of the radius of the rear drumhead, 90% or more of the radius of the rear drumhead, or more. The dampener can in some embodiments include a cutout portion 630*a* as shown, though in some embodiments no cutout portion is included. For instance, FIG. 6D shows an embodiment of a drum 690 with a dampener 692 with no cutout portion.

The dampener 632 can help to lessen the acoustic sound produced by the drum 600, such as be lessening the vibration of the rear drumhead after it is struck by a beater. This can be true whether an electronic drumhead (e.g., made of a material previously described such as PET) or an acoustic drumhead is used.

The entire trigger platform 602, including but not limited to arms 604, electronics portion 608, substrate 630, and dampener 632 can be removed and an acoustic rear drumhead placed on the drum 600 to provide the user with a traditional drum that can include all of the traditional components (e.g., lugs and tensioning screws). Like the drum 300, an acoustic rear drumhead can also be used in conjunction with the trigger platform 602. It is understood that dampeners can be used in instruments other than bass drums, such as the snare drum 300, other types of drums and/or percussion instruments, or other types of instruments altogether.

One or more pressure sensors, such as FS sensors (e.g., FSR sensors), can be used as part of the drum 600. For instance, the electronics portion 608 can be similar to the electronics portion 500, and contain an FS sensor similar to or the same as the FS sensor 592. Whereas the FS sensor 592 used in conjunction with the snare drum 300 is most often used to sense whether a user is applying pressure to the top drumhead, an FS sensor used in conjunction with a bass drum such as the bass drum 600 can sense whether (and to what extent) a user is "burying" the bass drum pedal into the bass drum 600. Burying a bass drum pedal is a technique by which a drummer attempts to (or accomplishes) holding the beater head against the bass drum instead of allowing it to rebound, resulting in less resonance. The FS sensor can sense the extent to which a user buries the beater head, and adjust the electronically produced sound accordingly.

Additionally, some embodiments of the present disclosure can be drum heads that already include the components previously described. For instance, it is contemplated that an electronic drum head could include an electronic (e.g., the electronic 200) therein or on a bottom surface thereof, with or without a support structure, and the electronic drum head could be used with various instruments.

Cymbal Instrument Examples

Below are specific embodiments of percussion instruments incorporating elements and concepts of the present disclosure, those percussion instruments including one or more cymbals. It is understood, however, that the elements and concepts described with respect to each example are not specifically limited to that type of instrument. Many different embodiments are possible as would be understood by one of skill in the art.

Example 4: Cymbal Assembly

Figure 7A:
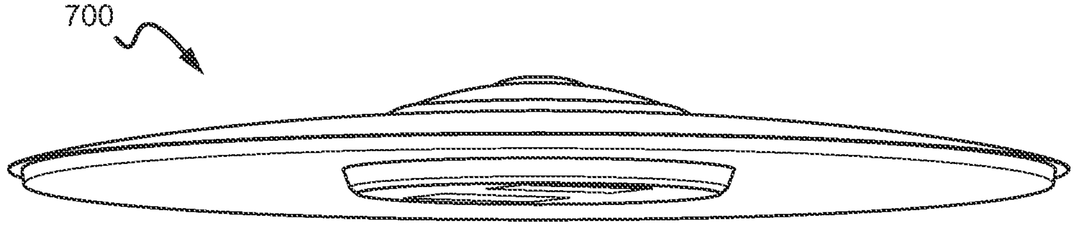
FIGS. 7A and 7B are bottom perspective views and FIG. 7C is a top perspective view of a cymbal assembly according to the present disclosure.
Figure 7B:
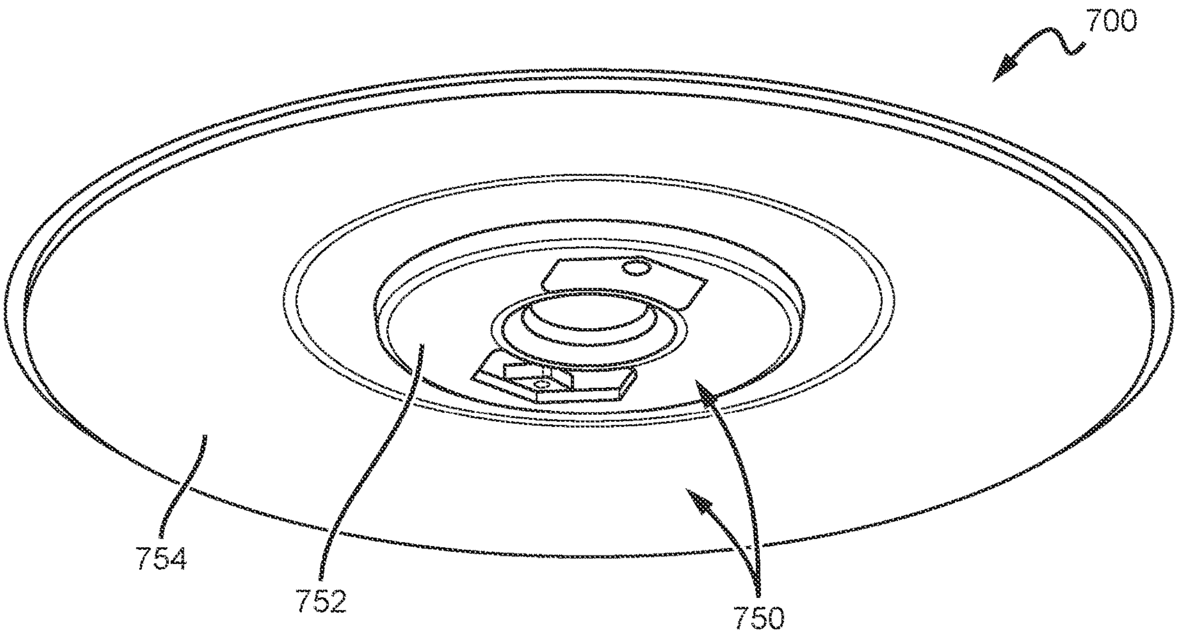
Figure 7C:
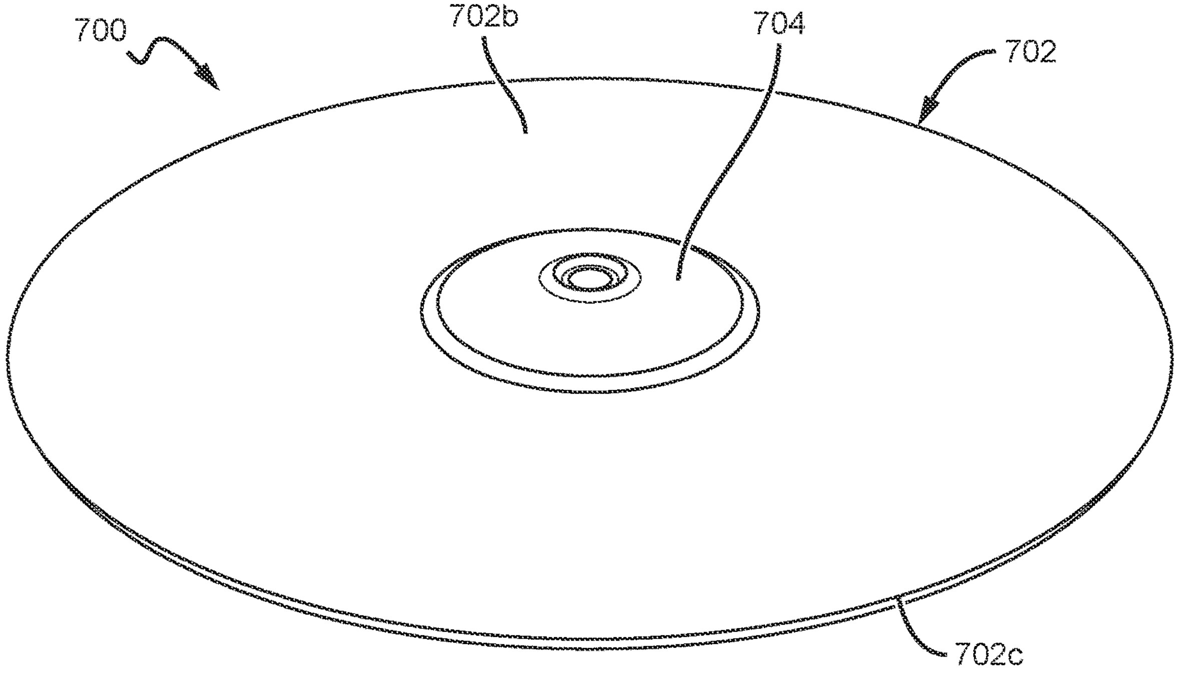
Figure 7D:
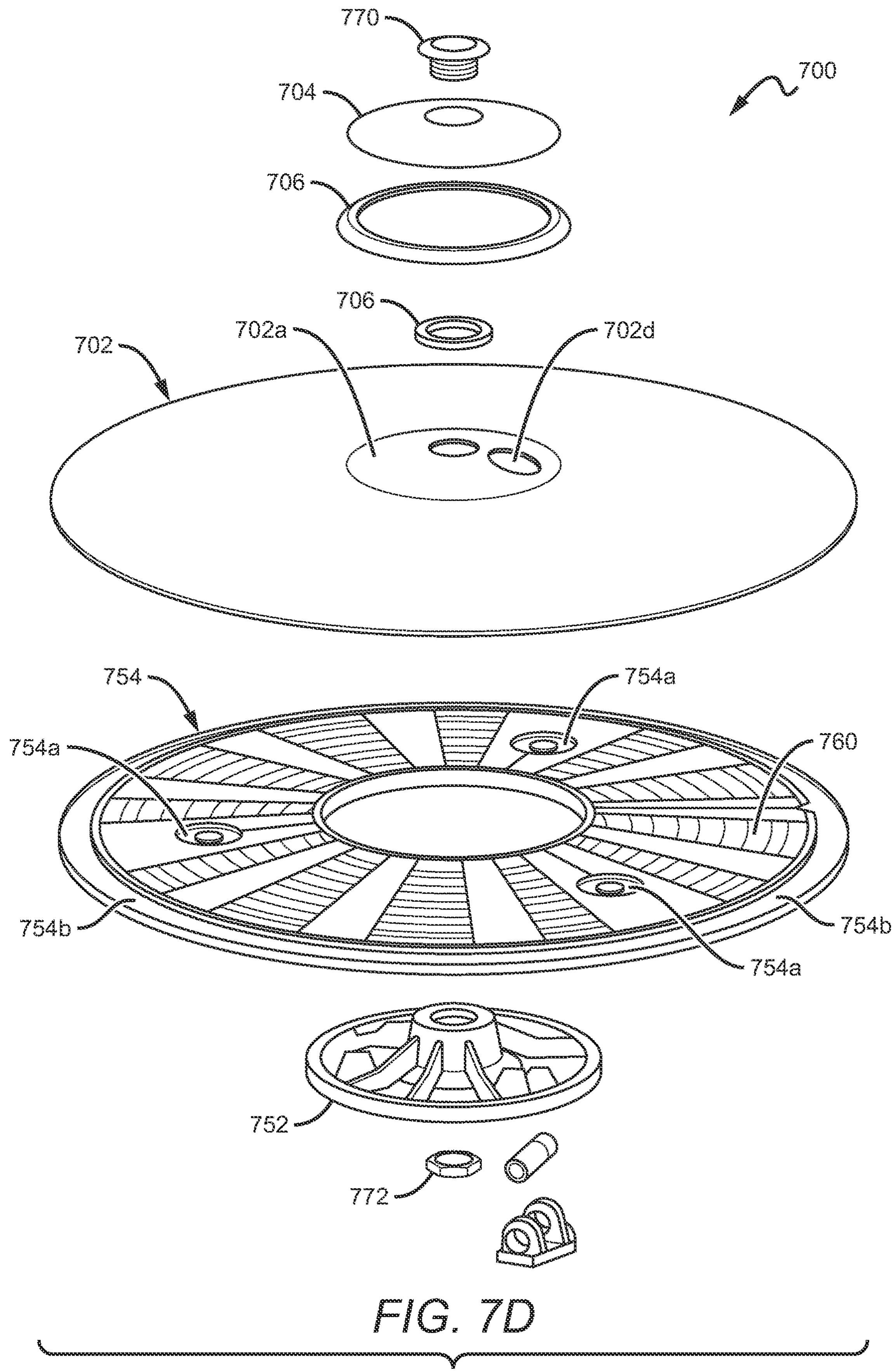
FIGS. 7D and 7E are exploded perspective views of the cymbal assembly shown in FIGS. 7A-7C.
Figure 7E:
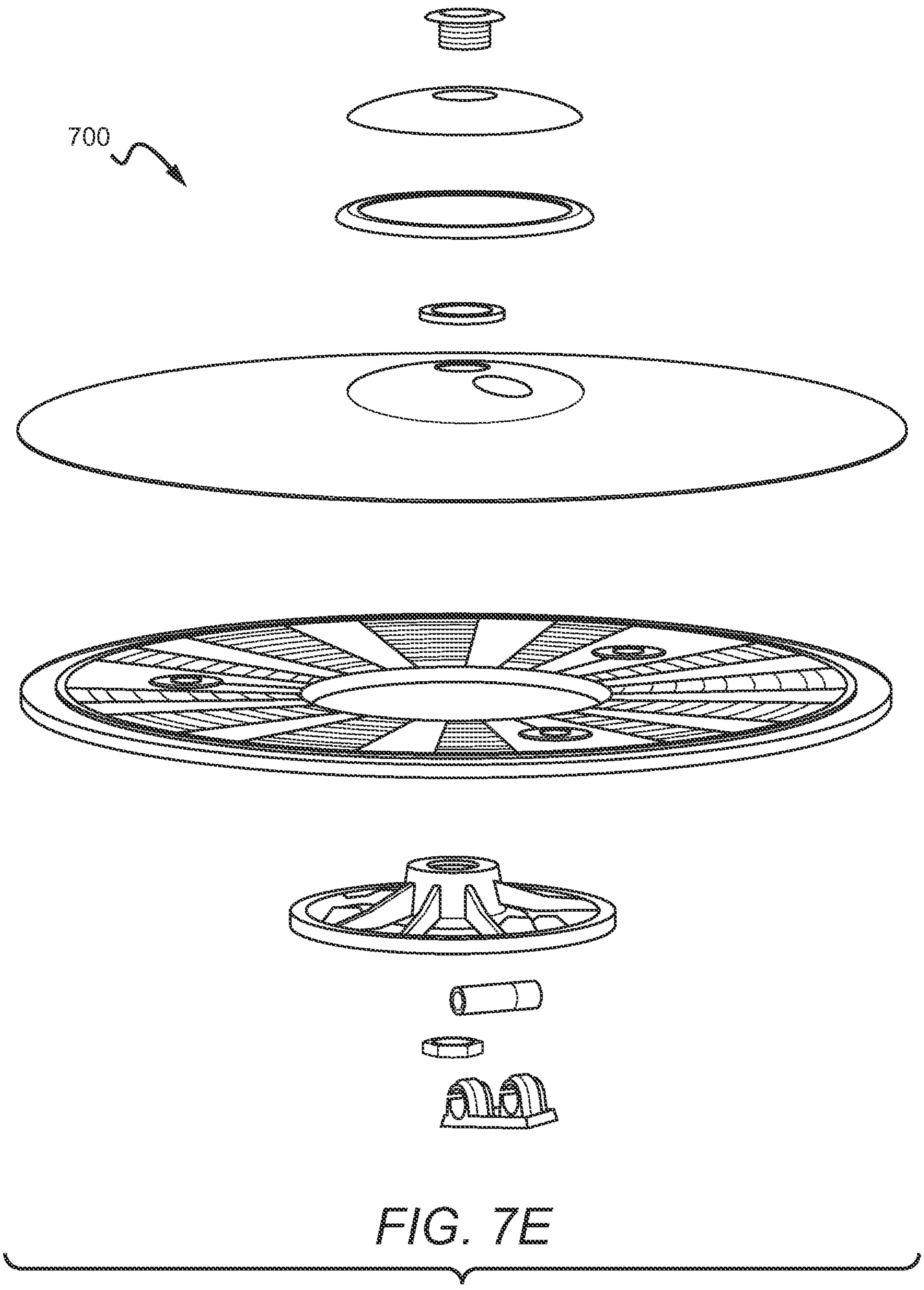

FIGS. 7A-7F show various views of a cymbal assembly 700 according to the present disclosure. As best seen in FIG. 7D, the cymbal assembly 700 can include a striking portion 702, a secondary bell 704, and an electronics portion 750, the electronics portion including an electronics module 752 and a sensor module 754, which in the embodiment shown circumferentially surrounds the electronics module 752. It is understood that embodiments without certain ones of these components are possible. For instance, in some embodiments, the secondary bell 704 may not be present, in some embodiments, the electronics portion may only include the electronics module 752; etc. Other traditional components of a cymbal stand can also be included, such as a cymbal stand rod. Many different embodiments are possible. The electronics portion 750 can be removable from the cymbal stand rod, such as by removing fasteners.

The secondary bell 704 can be over the striking portion 702, while the electronics portion 750 is underneath the striking portion 702. The electronics portion 750 (including one or both of the electronics module 752 and the sensor module 754), striking portion 702, and secondary bell 704 can each be shaped to define an axial hole through which a stand rod (e.g., a cymbal stand rod) can pass, with each of these components mounted to the stand and resembling a traditional acoustic cymbal stand assembly.

In some embodiments, the striking portion 702 and/or the electronics portion 750 have circular cross-sections, and/or are disc-shaped. The electronics portion 750 can have the same radius, area, and/or cross-sectional size as the striking portion 702, or may have a smaller radius, area, and/or cross-sectional size, as in the embodiment shown, which can help to hide the electronics portion 750 from view. The electronics portion 750 can have an area that is smaller than the striking portion 702 bottom area but that is 25% or more, 33% or more, 50% or more, 66% or more, 75% or more, 90% or more, or even more of the striking portion 702 bottom area. The electronics portion 750 can be approximately circular, and can have a radius that is less than 100% of, but 25% or more, 33% or more, 50% or more, 66% or more, 75% or more, 90% or more, or more of the striking portion 702 radius. The outer edge of the electronics portion 750 can be inwardly offset from the edge of the striking portion 702 by various distances, such as 3" or less, 2.5" or less, 2" or less, 1.5" or less, 1" or less, ¾" or less, ½" or less, ¼" or less, or even less; and/or by 1⁄32" to 2", 1⁄16" to 1.5", 1⁄16" to 1", ⅛" to 1", ⅛" to ¾", or ⅛" to ½"; and/or by 1⁄32" or more, 1⁄16" or more, ⅛" or more, ¼" or more, ½ or more, ¾" or more, 1" or more, 1.5" or more, 2" or more, or even more. Combinations of these ranges are possible, and it is understood that offsets outside these ranges are also possible.

In some embodiments, the striking portion 702 is a traditional cymbal and can be made of metal, such as copper alloys (e.g., bell bronze, malleable bronze, brass, nickel silver). In some other embodiments, the striking portion 702 is made of and/or comprises a material that makes less noise when actuated, such as plastic, Mylar, PET, rubber, and/or other materials as known in the art or previously described herein. The electronics portion 750 can be made of various materials known in the art, such as plastics and/or metal. Many different materials are possible.

The cymbal assembly 700 can include one or more sensors for recognizing a user actuation. A traditional cymbal will make a different sound depending on where it is struck: the bell (the raised middle portion), the bow (the main body of the cymbal, extending from the bottom of the bell outward), and the edge. The bell, bow, and edge of the striking portion 702 are shown as elements 702*a*,702*b*,702*c*, respectively, in FIGS. 7C and 7D. In the specific embodiment shown, the cymbal assembly 700 includes three sensor groups, each of which can include one or more sensors: a bell sensor or sensors, a bow sensor or sensors, and an edge sensor or sensors. It is understood that embodiments of the present disclosure can include just one of these sensor groups, any two of these sensor groups, or all three of these sensor groups, and that additional sensor groups can be added.

Bell Sensor(s)

With regard to the bell sensor group, one or more sensors (e.g., piezoelectric sensors) can be placed on the underside of the secondary bell 704 or elsewhere as would be understood by one of skill in the art (e.g., on the top of the bell 702*a*). The sensors can be placed onto the underside of the secondary bell 704 through an attachment aperture in the striking portion 702, such as the attachment aperture 702*d*. An attachment aperture 702*d* can be included for each sensor that is attached. Any number of sensors can be attached, such as one bell sensor, two bell sensors, three bell sensors, or more. The use of attachment apertures 702*d* can be helpful in preventing shorting of the sensors, such as by allowing an attachment mechanism such as adhesive an outlet when the sensor is placed through the attachment aperture 702*d* and pressed against the underside of the secondary bell 704.

The use of the secondary bell 704 instead of the bell of the striking portion 702 can be beneficial in that it can result in reduced acoustic resonance of the striking portion 702. The secondary bell 704 can have an area that is 50% or less, 25% or less, 20% or less, 15% or less, 10% or less, or even less the area of the striking portion 702. The secondary bell 704 can be separated from the striking portion 702, such as via one or more separators 706, such as rubber separators or washers, in order to reduce and/or prevent contact to the secondary bell 704 being transferred to the striking portion 702. However, it is understood that in other arrangements, the bell of the striking portion 702 may be used. In such arrangements, sensors for recognizing bell strikes may be included as part of the electronics portion 750.

Bow Sensor(s)

One or more bow sensors can be included as part of the electronics portion 750, such as on the sensor module 754. For instance, in the specific embodiment shown, three sensors can be included at the locations 754*a*. These sensors can be used to recognize actuations on the bow of the cymbal assembly 700. The bow sensors can be piezoelectric sensors, or other sensors as would be understood by one of skill in the art. It is understood that any number of sensors can be used, with two or more (e.g., three) sensors being beneficial to the reduction of hotspots.

The striking portion 702 and the electronics portion 750 can be separated by a relatively small distance when at rest, such as an inch or less, ¾" or less, ½" or less, ¼" or less, or even less. This separation can be achieved using a separator such as an O-ring, which can, for example, be placed in a channel on the topside of the electronics portion, such as the channel 760 on the topside of the sensor module 754. In other embodiments, the striking portion 702 and electronics portion 750 may be in direct contact.

In some embodiments, a dampening material is included between the electronics portion 750 and the striking portion 702 to reduce the acoustic sound produced by an actuation of the striking portion 702. The dampening material could be included, for instance, on the topside of the sensor module 754 and/or the entire electronics portion 750. The damping material can cover 25% or more, 50% or more, 75% or more, 85% or more, 90% or more, or even more of the area of the underside of the striking portion 702, though other embodiments are possible. The dampening material can be, for instance, foam, rubber, and/or any other material that can reduce the acoustic sound that would otherwise be produced by an actuation of the striking portion 702 as would be understood by one of skill in the art In some embodiments, the sensors are uncovered by and/or stick through the dampening material which is otherwise generally over the top surface of the sensor module 754, such as an embodiment where cutouts are included in the dampening material in the area of the sensors. In other embodiments, the dampening material serves as a mechanical link between the sensors and the underside of the striking portion 702. In other embodiments, the sensors are uncovered by and/or stick through the dampening material, and are mechanically linked to the underside of the striking portion 702 in another manner, such as via one or more mechanical posts that can be made of, for instance, rubber or another material as would be understood by one of skill in the art. In other embodiments, the sensors may not be in physical contact with the striking portion 702. In other embodiments, the sensors may be in direct physical contact with the striking portion 702. Many different embodiments are possible.

Edge Sensor(s)

The cymbal assembly 700 can also include one or more edge sensors. The edge sensors can be placed around the edge of the electronics portion 750, such as around the top edge 754*b* of the sensor module 754. The top edge 754*b* of the sensor module 754 can include an edge wall at the end thereof, or may not include such a wall and simply end at a ledge. The top edge 754*b* can be substantially flat in nature to allow for the placement of the edge sensor(s).

In one embodiment, a singular and/or monolithic edge sensor can be used to cover more than 180°, 270° or more, 300° or more, 330° or more, 345° or more, 350° or more, or 355° or more of the top edge 754*b*. A small gap between the ends of the edge sensor can be included so as to allow for easier placement, since the top edge 754*b*, while substantially flat, can be slightly frustoconical in shape (like a traditional cymbal). It is understood that other embodiments are possible, such as an embodiment where a singular and/or monolithic edge sensor covers 360° of the top edge 754*b*, and an embodiment where two or more sensors are used to cover more than 180°, 270° or more, 300° or more, 330° or more, 345° or more, 350° or more, or 355° or more of the top edge 754*b*, and/or less than 360°. In embodiments with multiple sensors, the sensor ends may meet, may overlap, or a gap may be left between them. Many different embodiments are possible.

With a traditional acoustic cymbal, a user can "choke" the cymbal (i.e., stop the cymbal from producing sound after an actuation, or lessen that sound) by grabbing the underside and topside of the cymbal with his fingers, causing a reduction in the cymbal's vibration. The edge sensor(s) can be used 1) to recognize a choke, and/or 2) to recognize an edge strike. In another embodiment, the edge sensor(s) are used only to recognize a choke, while the bow sensor(s) described above recognize an edge strike. Many different embodiments are possible.

In one embodiment, the edge sensor is an FS sensor (e.g., FSR sensor) (or if multiple edge sensors are included, multiple FS sensors). The user can utilize a traditional choking movement, pressing down on the topside of the striking portion 702 and up on the underside of the electronics portion 750, such as the sensor module 754; and/or otherwise squeeze or move the edges of the striking portion 702 and electronics portion 750 closer together. As the striking portion 702 and the sensor module 754 are squeezed together, the FS sensor(s) senses increased pressure, and sends a corresponding impulse or message (such as to an electronic included in the electronics module 752, to be discussed in more detail below).

The use of one or more FS sensors for the edge sensor(s) can be particularly useful, in that it can act as a continuous controller instead of a switch. Whereas prior art electronic cymbals utilize a switch such that the cymbal is either completely choked or unchoked, a continuous controller embodiment such as the cymbal assembly 700 allows for a greater amount of control by the user. The user can, for instance, slightly choke the cymbal assembly 700 so as to quiet the sound and/or reduce the overall decay time and/or increase decay speed as a drummer could with a traditional acoustic cymbal (such as by squeezing the cymbal more gently). It is understood, however, that other embodiments are possible, such as switched embodiments and embodiments utilizing other types of sensors (e.g., piezoelectric edge sensors).

Other manners of causing the cymbal to "choke" are also possible, as opposed to squeezing together the striking portion 702 and electronics portion 750. For instance, in one embodiment, the cymbal assembly 700 can sense certain types of contact from a user, such as a hand touch. In one embodiment, if a user uses his or her hand to touch both the striking portion 702 and the electronics portion 750, a circuit is completed. The completion of this circuit can result in a signal being sent that results in a "choke" of the cymbal. In other embodiments, one or more capacitive sensors may be used to recognize the proximity of the striking portion 702 and electronics portion 750. This recognition can be used by an included electronics portion in order to alter the signal produced by the instrument (e.g., to "choke" the cymbal).

Mechanical Connections

Figure 7F:
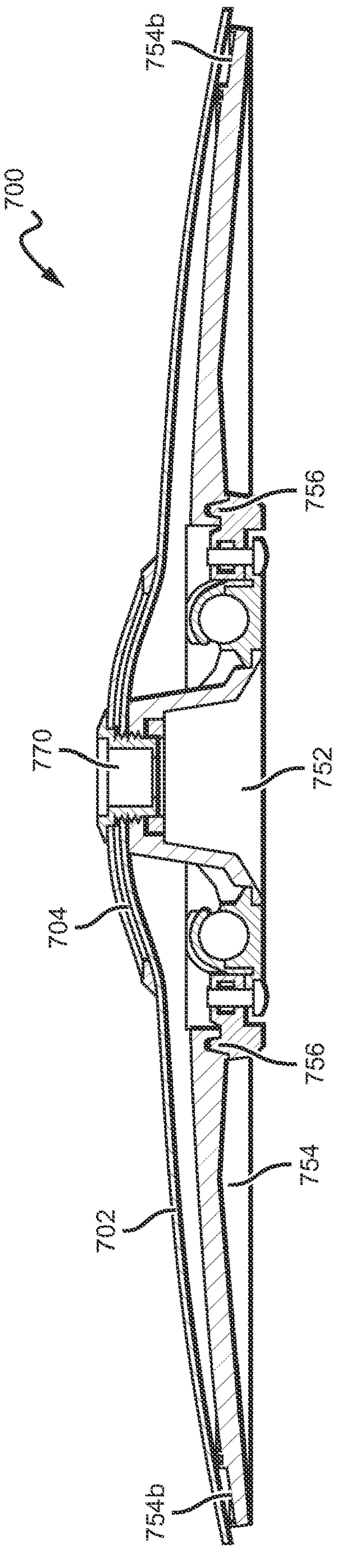
FIG. 7F is a cross-sectional view of the cymbal assembly shown in FIGS. 7A-7C.

FIG. 7F shows a cross-sectional view of the cymbal assembly 700. The components of the cymbal assembly 700 can be held together via one or more connectors/fasteners, such as a nut-and-bolt connection. For instance, as can be best seen in FIGS. 7D and 7F, a first connection piece 770 (referred to hereinafter as a "bolt" for simplicity) can connect to a second connection piece 772 (referred to hereinafter as a "nut" for simplicity) through the axial holes of the other components, such as the secondary bell 704, the striking portion 702, and the electronics portion 750 (such as the electronics module 752). In order to hold the components together tightly, the axial holes of the components (e.g., the components 704,702,750,752) can be larger than the typical ½" axial holes of traditional acoustic cymbal assemblies. For instance, the axial holes can be ⅝" or larger, ¾" or larger, ⅞" or larger, approximately 1" or larger, 1.25" or larger, 1.5" or larger, or even larger. It is understood, however, that smaller axial holes are also possible. The inclusion of a larger axial hole allows for the use of larger connection pieces such as the bolt 770, which can result in a tighter connection between components. The nut 772, when tightened, can be within an aperture of the electronics portion 750 and/or electronics module 752.

The use of a multipiece electronics portion 750 can have distinct advantages over prior art arrangements. For instance, by including an electronics module 752 that is relatively small in conjunction with a sensor module 754 that corresponds more closely to the size of the striking portion 702, the same electronics module 752 can be used with a variety of sizes of striking portions and cymbal assemblies, or even other instruments. This results in greater manufacturing efficiency, since the same electronics module 752 can be used for a variety of different products. However, it is understood that monolithic/single piece electronics portions are possible.

The electronics module 752 can connect, such as detachably connect, with one or more of the other components of the cymbal assembly 700. For instance, as can be seen in FIG. 7F, the electronics module 752 can connect (in this specific embodiment, detachably connect) to the sensor module 754, such as via interlocking. In some instances, this can be a snap and/or male female connection. In the specific embodiment shown, the electronics module 752 can connect to the sensor module 754 via one or more male/female connections 756, with the electronics module 752 including male component(s) 756*a* (seen best in FIG. 8C) and the sensor module 754 including accompanying female component(s), though it is understood that any male/female connection could be used as would be understood by one of skill in the art. The connections can be generally circular in nature, as shown in this embodiment, though other embodiments are possible. Other types of connections (e.g., using fasteners and/or adhesives) are also possible in addition to or in place of the described connections.

Electronics Portion and Electronics Module

Figure 8A:
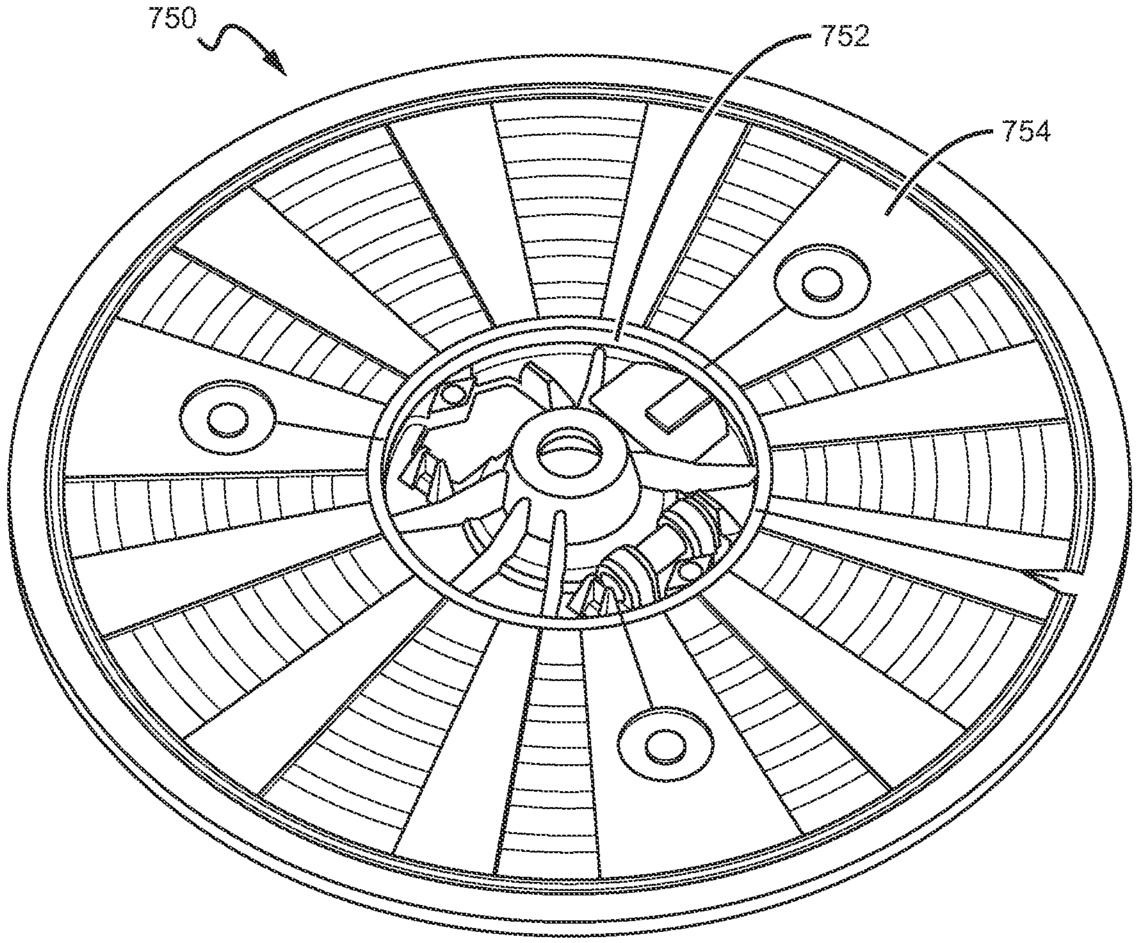
FIGS. 8A-8C are perspective views of portions of the cymbal assembly shown in FIGS. 7A-7F.
Figure 8B:
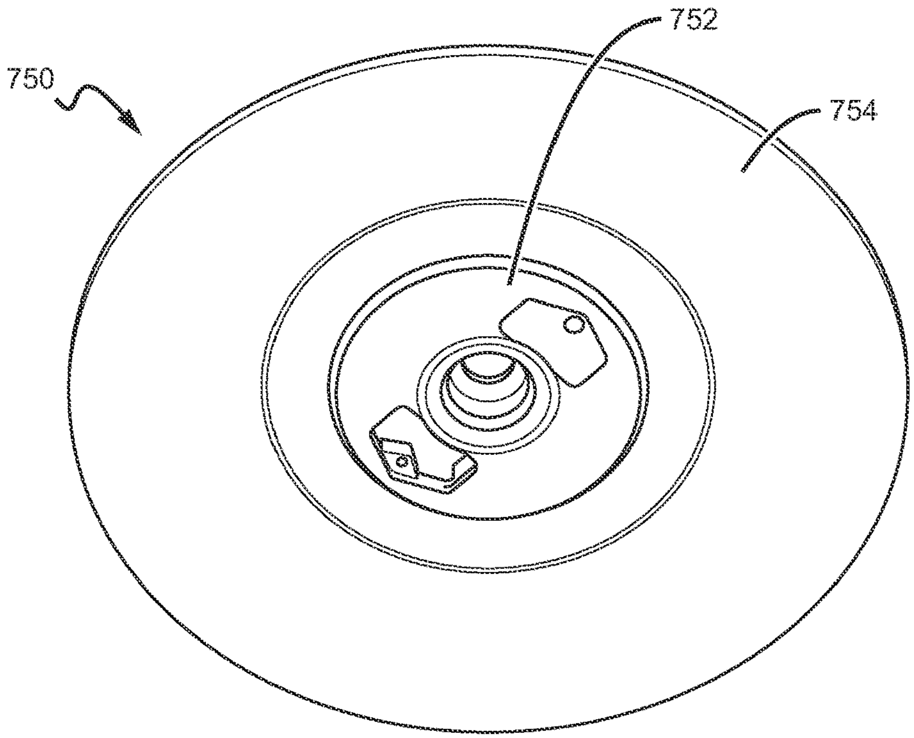
Figure 8C:
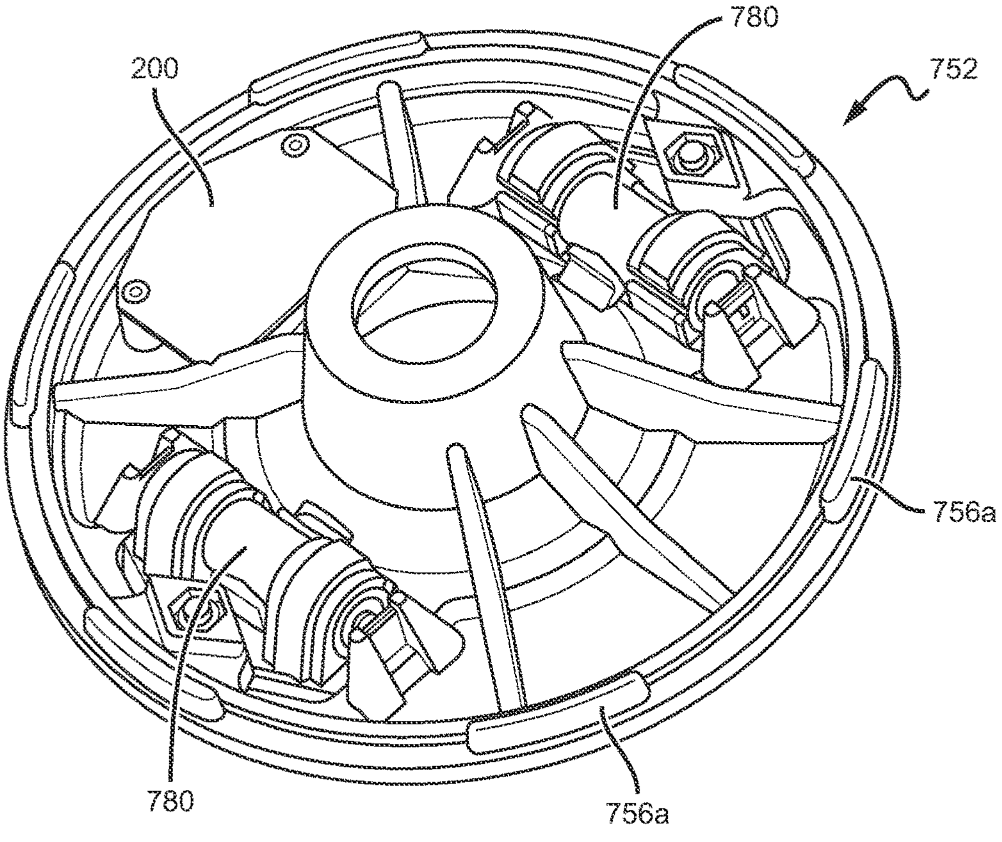

FIGS. 8A and 8B are views of the electronics portion 750, while FIG. 8C shows the electronics module 752. The electronics module 752 can include an electronic such as the electronic 200. The electronic 200 can be connected to the above-described sensors, such as via wire connections. The electronics module 752 can also include one or more power sources 780 that can be local power sources, such as batteries.

Because the cymbal assembly 700 is self-powered and transmits wirelessly, it does not require external connections, such as external wire connections. In prior art electronic cymbal assemblies, wire connections are required. These wire connections can prevent the free movement and rotation of the cymbal assembly striking portion, because such movement/rotation causes twisting of the external wires and/or wires running from a foot pedal to the cymbals. However, because external wire connections have been eliminated, the striking portion 702 of the cymbal assembly 700 can freely move and rotate similar to the cymbal of an acoustic cymbal assembly.

Example 5: Hi-Hat Assembly Embodiment 1

Figure 9A:
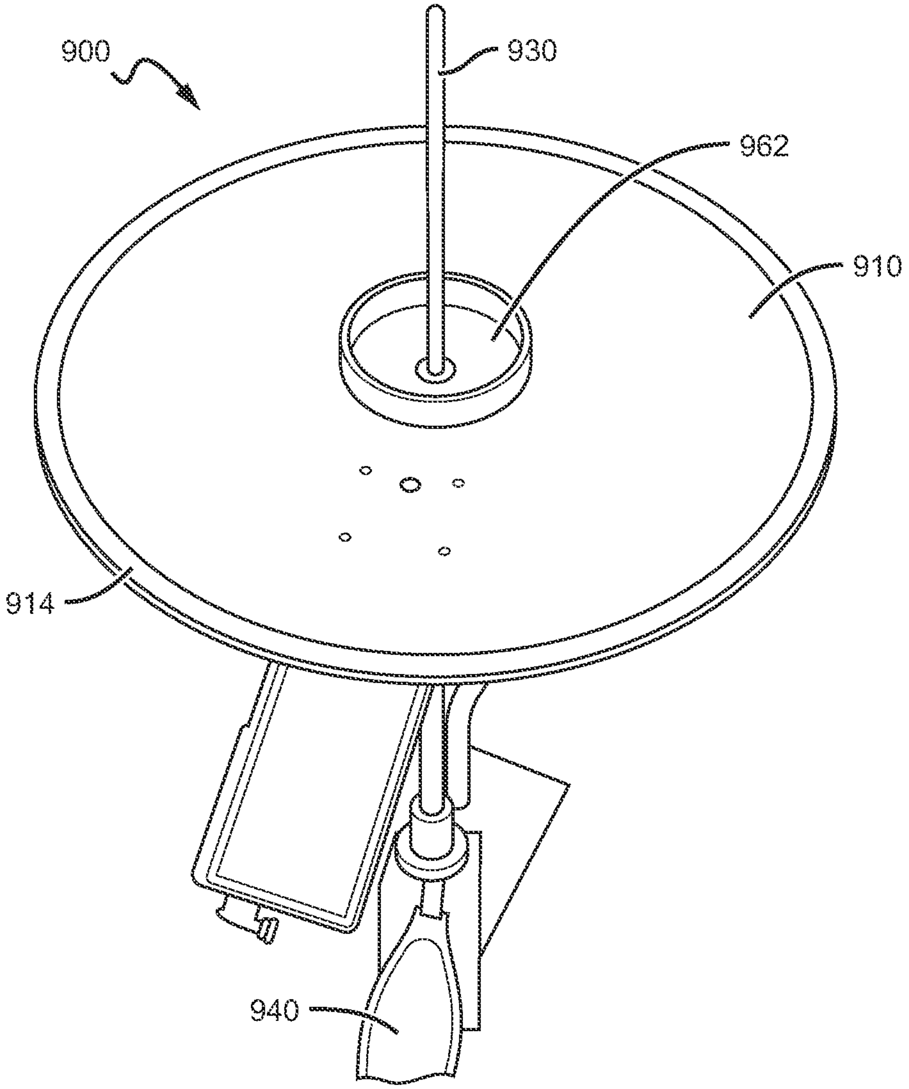
FIGS. 9A-9C are perspective views of portions of a hi-hat assembly according to the present disclosure.
Figure 9B:
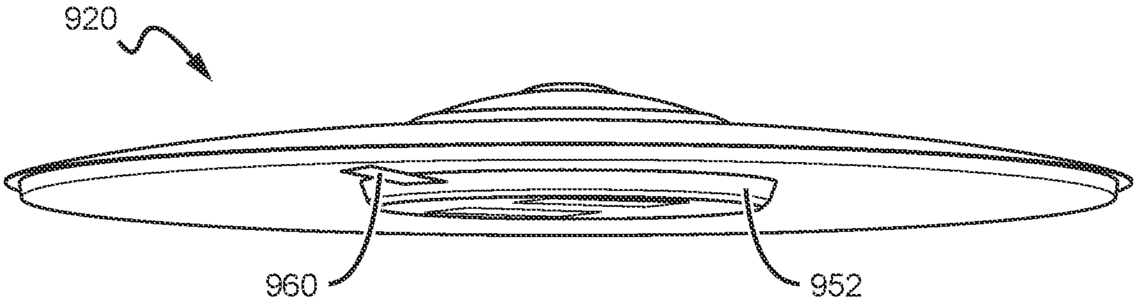
Figure 9C:
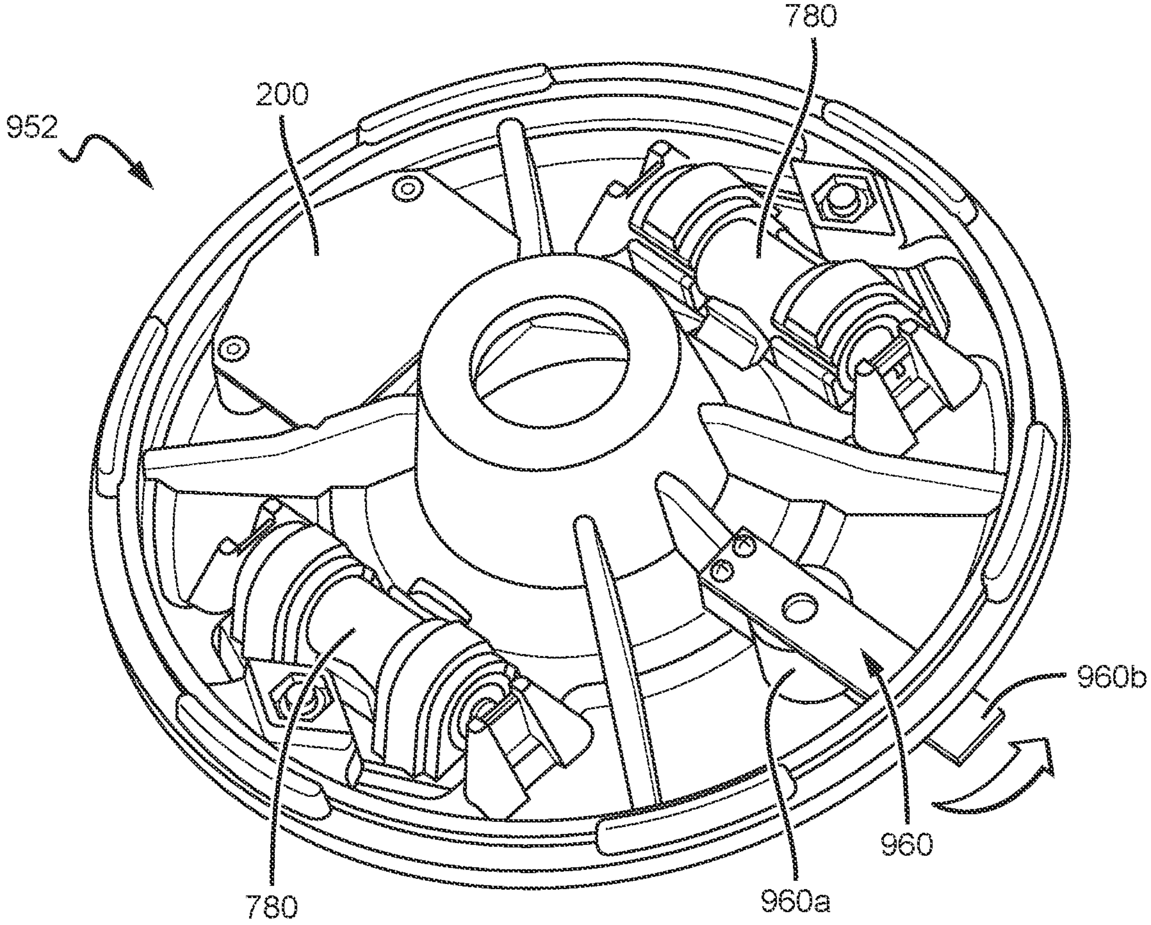

As another example of a cymbal instrument according to the present disclosure, FIGS. 9A-9C show example components of a hi-hat assembly 900. The hi-hat assembly 900 can include a bottom cymbal 910 and a top cymbal 920, which can be mounted on a stand 930, and a pedal 940. The pedal can be operable to move the top cymbal 920 downward and toward the bottom cymbal 910, with top cymbal 920 movements sometimes resulting in striking the bottom cymbal 910 and sometimes resulting only in becoming closer to the bottom cymbal 910. The top and/or bottom cymbals 920,910 (in this case, only the top cymbal 920) can include many components similar to and/or the same as those included in the cymbal assembly 700 described above with regard to FIGS. 7A-7F, and in one embodiment is substantially equivalent to the cymbal assembly 700 with the exception of a modified electronics module, which will be discussed in detail below with regard to FIG. 9C.

A ring 914, which can be of one or more sound dampening materials such as foam, rubber, and/or other materials known in the art, can be used to dampen and/or prevent acoustic sound being produced by the cymbals 910,920 coming into contact with one another. Other elements and methods for dampening could be used in addition to or in place of the ring 914 as would be understood by one of skill in the art.

The hi-hat 900 can also include electronics and related components, in this case as part of the top cymbal 920, though it is understood that other mounting arrangements are possible, such as being mounted to the topside of the bottom cymbal 910. For instance, electronics and related components can be included in an electronics module 952, shown in detail in FIG. 9C. The electronics module 952 can include many of the same or similar components as the electronics module 752, such as an electronic 200 and one or more power sources 780.

The shown assembly and other embodiments of the present disclosure can also include a capacitive lever 960. In the specific embodiment shown, the capacitive lever 960 includes a mount portion 960*a* and a lever portion 960*b*, though many different embodiments are possible, and the mount portion could be omitted in some embodiments. The lever portion 960*b* can be, for example, a spring metal strip, and can be made of a conductive material such as metal. The mount portion 960*a* can be round (similar to or the same as the mount portion 1060*a* discussed in more detail below), and can be covered by two layers: a conductive layer that can be connected to the electronic 200, and a non-conductive layer over and/or covering the conductive layer to prevent the lever portion 960*b* from making contact with the conductive layer because the non-conductive layer is between the conductive layer and the lever portion 960*b*. In the embodiment shown, the capacitive lever 960 is part of the electronics module 952, though other embodiments are possible. As with the cymbal assembly 700, by including the capacitive lever 960 as part of the electronics module 952, the electronics module 952 can be used with varying sizes of instruments such as hi-hats.

As the lever portion 960*b* is moved (in the embodiment shown, in the rotational direction shown and/or in the direction shown by the arrow, though other embodiments are possible) it flexes/rolls on the mount portion 960*b*, which can be round shaped. In embodiments where the mount portion 960*b* is round, this allows the lever portion 960*b* to gradually make more (or less) contact with the mount portion 960*a* as it changes position, resulting in great sensitivity and accuracy. As the lever portion 960*b* is moved, a capacitive displacement sensor measures the change in position and produces a signal corresponding to the position. This signal is an input into the electronic 200. In order to cause rotation of the capacitive lever, an actuator such as the actuator 962 can be used. The actuator in this embodiment is included above the bottom cymbal 910 and below the top cymbal 920, and can be mounted to the stand 930 and/or be included as part of the top cymbal 920. The actuator 962 can be circumferential in nature (e.g., as shown, a cup shape) so as to operate effectively no matter the orientation of the top cymbal 920 (and thus the capacitive lever 960). In operation, as the top cymbal 920 is moved downward, the capacitive lever 960 encounters the actuator 960 and is rotated upward. The capacitive displacement sensor can be used to measure the position of the capacitive lever 960 and, thus, the position of the top cymbal 920 in relation to the bottom cymbal 910 and/or the proximity of the cymbals 910,920.

In a traditional hi-hat assembly, the sound produced when a user strikes the top cymbal, such as with a drumstick, will vary based on the position of the top cymbal relative to the bottom cymbal. For instance, if a the user has actuated the pedal to a point where the top cymbal has moved halfway toward the bottom cymbal, then the sound produced upon striking the top cymbal will be different than the sound that is produced when striking the top cymbal when it is at its resting position. In the embodiment shown, when a user strikes the assembly with a drum stick, such as by striking the topside of the top cymbal 920, the relative position of the top and bottom cymbals 910,920 is measured using the capacitive lever 960, and a signal corresponding to that position is used as an input to produce a sound, such as an input to the electronic 200. The sensor impulse will vary based on the position of the capacitive lever 960, which itself varies based on the relative positions of the top and bottom cymbals 910,920 (in this case, based on the position of the top cymbal 920); and the sound produced can vary based on the message/impulse.

In this specific embodiment, the lever 960 is used to measure position through capacitance variation. However, other embodiments are possible. For instance, in some embodiments, a different mechanism than a lever is used, such as a compressible device whose vertical height varies based on the relative positions of the cymbals. In other embodiments, variables other than capacitance are used. In some embodiments, more than one measuring device (such as but not limited to levers) are used. In some embodiments, the measuring device, which is included as part of the electronics module 952 in a central position of the assembly, is in another position, such as a position near the rim of the cymbal or in an intermediate position. In one contemplated embodiment, an optical sensor is used to measure the distance between the two cymbals. In another contemplated embodiment, a sound and/or light reflection/time-of-flight measurement is used to determine the space between the two cymbals, such as an optical and/or time-of-flight sensor. Many different embodiments are possible.

An embodiment where electronics and/or the position sensing mechanism (such as the lever 960) are included proximate and/or between the cymbals, such as the assembly 900 where the electronics are included between the top and bottom cymbals 920,910, can have distinct advantages over embodiments where cymbal position sensing elements are included elsewhere. For instance, when position sensing utilizes elements in the pedal, a wire often must be run from the pedal, such as to a transmitter/converter (e.g., the transmitter/converter 952). This can be cumbersome, and is avoided in the assembly 900 by including all or substantially all electronic components between and/or proximate the cymbals 910,920. As with all of the embodiments of the present disclosure, this is also beneficial in that the user can select his or her own hardware to use with each drum, such as his or her favorite drum pedal.

Example 6: Hi-Hat Assembly Embodiment 1

Figure 10A:
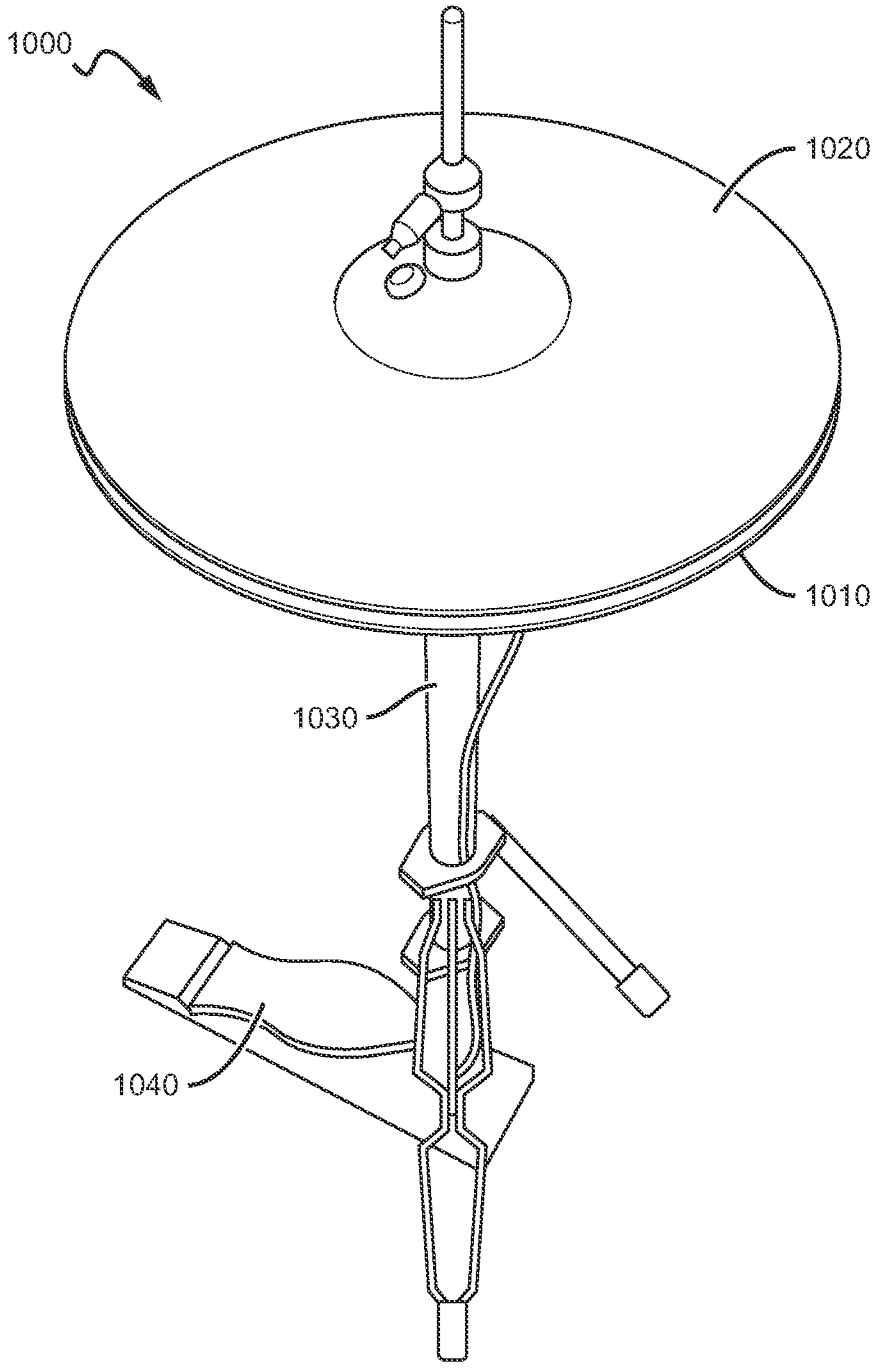
Figure 11A:
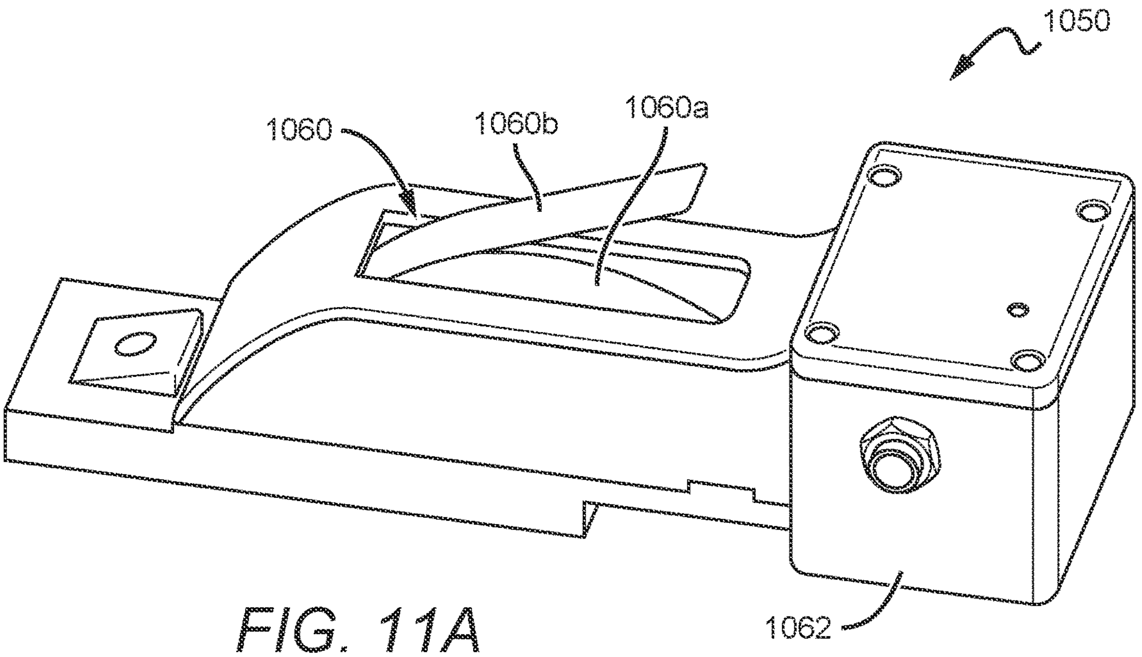
FIGS. 11A and 11B are perspective and exploded perspective views, respectively, of portions of the hi-hat assembly shown in FIGS. 10A-10C.
Figure 11B:
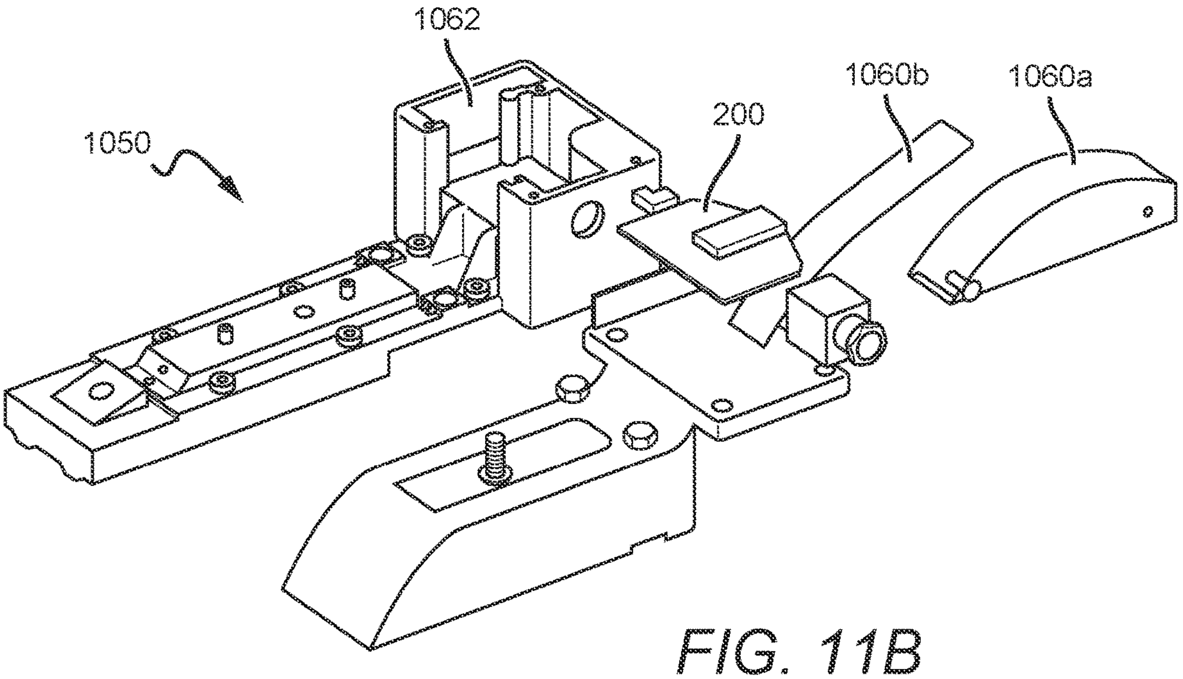

As another example of a cymbal instrument according to the present disclosure, FIGS. 10A-10C show a hi-hat assembly 1000. The hi-hat assembly can include a bottom cymbal 1010 and top cymbal 1020, which can be mounted on a stand 1030, and a pedal 1040. The assembly also includes an electronics portion 1050, which is also shown in FIGS. 11A and 11B. The electronics portion 1050 can be under the pedal 1040 as shown, though other embodiments are possible. The electronics portion 1050 can include, for example, a capacitive lever 1060 (itself including a mount portion 1060*a* and a lever portion 1060*b*), an electronic 200 and a power source such as batteries (which can be included in an electronics compartment 1062), and a jack for a wire connection 1080, though it is understood that some of these components (e.g., the jack and wire connection 1080) can be omitted in some embodiments.

In this embodiment, a capacitive lever 1060 similar to the capacitive lever 960 from FIGS. 9A-9C is included, but the electronics portion 1050 is a part of the pedal 1040 instead of between the cymbals 1010,1020. It is understood that components similar to those shown for the capacitive lever 960 could be used instead of the components of the capacitive lever 1060, and components similar to those shown for the capacitive lever 1060 could be used instead of the components of the capacitive lever 960 in the hi-hat assembly 900. Additionally, it is understood that the electronics portion 1050 can be used with pedals that are not part of a hi-hat, but part of another type of assembly, such as a bass drum beating assembly. Many different embodiments and combinations are possible.

As can be best seen in FIGS. 10B and 10C, as a user presses down the pedal 1040, the capacitive lever 1060 (specifically, the lever portion 1060*b*) is actuated and pressed downward, and when the pedal is raised, the capacitive lever 1060 is released and springs back upward. The assembly can include a stopper 1070 (e.g., a rubber stopper) to limit the range of motion of the pedal 1040 and lever portion 1060*b*. As the lever portion 1060*b* is pressed down, it is pressed onto the mount portion 1060*a*, which is round such that the lever portion 1060*b* makes gradually more contact with the mount portion 1060*a*. The mount portion 1060 can include two layers, the first being a conductive layer connected to an electronic 200, and the second a non-conductive layer (e.g., rubber and/or tape) for preventing contact of the lever portion 960*b* with the conductive layer (e.g., by being over the conductive layer, and/or between the conductive layer and the lever portion 1060*b*). The conductive layer and the lever portion 1060*b* can be connected to the electronic 200 (e.g. via wire connections) to accomplish the previously discussed sensing (e.g., capacitive sensing), which can be programmed into the electronic 200. The electronic can use the sensed information to produce sounds reminiscent of a traditional acoustic hi-hat.

The electronic 200 can be connected to the cymbals 1010,1020 and an electronics portion there (e.g., electronics portion 950), such as via the wire connection 1080, though it is understood that wireless versions are possible, such as versions where transmission is achieved wirelessly and/or where communication between the cymbals and electronic portion 1050 is not needed, such as embodiments where the pedal assembly is operating as an independent device with the role of informing the system (e.g., the hub) of pedal position.

It is understood that embodiments presented herein are meant to be exemplary. Embodiments of the present disclosure can comprise any combination of compatible features shown in the various figures, and these embodiments should not be limited to those expressly illustrated and discussed. For instance and not by way of limitation, the appended claims could be modified to be multiple dependent claims so as to combine any combinable combination of elements within a claim set, or from differing claim sets.

Although the present disclosure has been described in detail with reference to certain preferred configurations thereof, other versions are possible. Therefore, the spirit and scope of the disclosure should not be limited to the versions described above.

Additionally, it is understood that the components and concepts in the present disclosure can be applied to musical instruments not specifically mentioned herein. For instance, these components and concepts can be applied to handheld instruments (e.g. cowbells, congas, triangles, tambourines, shakers), musical instruments such as music pads, marching band instruments, and other types of percussion and non-percussion instruments. Additionally, the components and concepts (e.g., the electronics and/or electronics portions described here) could be part of a device or system separate from an instrument but attachable to an instrument (or a variety of different types of instruments), such as clip-on trigger devices, such as devices that are attachable to a drum rim and/or drumhead.

The foregoing is intended to cover all modifications and alternative constructions falling within the spirit and scope of the disclosure as expressed in the appended claims, wherein no portion of the disclosure is intended, expressly or implicitly, to be dedicated to the public domain if not set forth in the claims.

We claim:

1. A cymbal assembly, comprising:

a striking portion; and an electronics portion under said striking portion, said electronics portion comprising:

one or more FS sensors for recognizing a user moving edges of said striking portion and said electronics portion closer together, and producing a sensor impulse in response thereto; and an electronic for accepting sensor impulses from said one or more FS sensors; and a separator between said striking portion and said electronics portion, said separator in a channel on a topside of said electronics portion.

2. The cymbal assembly of claim 1, wherein said one or more FS sensors are around a top edge of said electronics portion.

3. The cymbal assembly of claim 2, wherein said one or more FS sensors are around 300° or more of said top edge of said electronics portion.

4. The cymbal assembly of claim 1, wherein said one or more FS sensors are continuous controller sensors.

5. The cymbal assembly of claim 1, wherein said one or more FS sensors comprises a single FSR sensor around 300° or more of a top edge of said electronics portion.

6. The cymbal assembly of claim 1, wherein said electronics portion further comprises one or more piezoelectric sensors for recognizing a user strike of said striking portion.

7. The cymbal assembly of claim 6, wherein said one or more piezoelectric sensors are directly on a topside of said electronics portion.

8. The cymbal assembly of claim 7, comprising at least three of said piezoelectric sensors.

9. The cymbal assembly of claim 6, wherein said electronic comprises a circuit board and a transmitter.

10. The cymbal assembly of claim 9, wherein said electronics portion comprises a local power source.

11. The cymbal assembly of claim 10, wherein said electronics portion comprises an electronics module and a sensor module circumferentially surrounding said electronics module, wherein said electronic and said local power source are on said electronics module, and wherein said one or more FS sensors are on said sensor module.

12. The cymbal assembly of claim 1, wherein said separator is on said one or more FS sensors.

13. The cymbal assembly of claim 1, wherein said one or more FS sensors are one or more FSR sensors.

14. A cymbal assembly, comprising:

a striking portion comprising a bow and a first bell;

a second bell over said first bell;

one or more bell sensors between said first bell and said second bell, said one or more bell sensors for recognizing a user actuation of said second bell and producing a sensor impulse in response thereto; and an electronics portion under said striking portion, said electronics portion comprising:

a sensor module comprising one or more sensors for recognizing a user actuation of said striking portion and producing a sensor impulse in response thereto; and an electronics module for accepting sensor impulses from said sensor module, said electronics module connected to said sensor module.

15. The cymbal assembly of claim 14, wherein said striking portion is a metal cymbal and said second bell is metal, and wherein said second bell is separated from said striking portion by one or more separators.

16. The cymbal assembly of claim 14, wherein said first bell is shaped to define an aperture beneath at least one of said one or more bell sensors.

17. The cymbal assembly of claim 14, wherein said electronics portion has a cross-section substantially corresponding to the shape and size of the striking portion.

18. The cymbal assembly of claim 14, wherein said sensor module circumferentially surrounds said electronics module.

19. The cymbal assembly of claim 14, wherein said electronics module is detachably connected to said sensor module.

* * * * *